United States Patent [19]

Waclawsky et al.

[11] Patent Number: 5,446,874

[45] Date of Patent: Aug. 29, 1995

[54] AUTOMATED BENCHMARKING WITH SELF CUSTOMIZATION

[75] Inventors: John G. Waclawsky, Frederick, Md.; Paul C. Hershey, Manassas, Va.; Raymond F. Daugherty, Mt. Airy, Md.

[73] Assignee: International Business Machines Corp., Armonk, N.Y.

[21] Appl. No.: 173,530

[22] Filed: Dec. 23, 1993

[51] Int. Cl.⁶ ............................................. G06F 11/00
[52] U.S. Cl. ................................... 395/575; 371/20.1
[58] Field of Search .............. 395/575; 371/20.1, 68.2, 371/20.4, 20.6, 68.2

[56] References Cited

U.S. PATENT DOCUMENTS

| | | | |
|---|---|---|---|
| 4,163,255 | 7/1979 | Pires | 358/122 |
| 4,227,245 | 10/1980 | Edbland et al. | 364/968 |
| 4,320,504 | 3/1982 | Alvarez, III et al. | 370/104 |
| 4,458,309 | 7/1984 | Wilder, Jr. | 364/200 |
| 4,459,656 | 7/1984 | Wilder, Jr. | 364/200 |
| 4,521,849 | 6/1985 | Wilder, Jr. | 364/200 |
| 4,566,098 | 1/1986 | Gammage et al. | 370/89 |
| 4,779,194 | 10/1988 | Jennings et al. | 364/200 |
| 4,805,089 | 2/1989 | Lane et al. | 364/200 |
| 4,851,998 | 7/1989 | Hospodor | 364/300 |
| 4,905,171 | 2/1990 | Kiel et al. | 364/200 |
| 4,939,724 | 7/1990 | Ebersole | 320/85.15 |

(List continued on next page.)

FOREIGN PATENT DOCUMENTS 61-53855 3/1986 Japan .

OTHER PUBLICATIONS

Haugdahl "Benchmarking LAN Protocol Analyzers" 1988 IEEE pp. 375–384.
Press, L. "Benchmarks for LAN Performance Evaluation" Aug. 1988 Communications of the ACM vol. 31 No. 8, pp. 1014–1017.
Press, L. "Expert System Benchmarks" IEEE Expert vol. 4 155.7 pp. 37–44; 1989.
Lide et al "A functional and Performance Comparison of NetBIOS and A PPC/PC" 1988 IEEE pp. 235–244.
Mondon et al "MARS: An Aid for Network Restoration after a Local Disturbance" Power Industry Computer Application, 1991 Conf. IEEE pp. 344–349.
Jo et al "Intelligent Routing in Large-Scale Communications Networks" Communications, 1991 IEEE Int. Conf. pp. 0677–0681.

Primary Examiner—Robert W. Beausoliel, Jr.
Assistant Examiner—Joseph E. Palys
Attorney, Agent, or Firm—John D. Flynn; Joseph C. Redmond; John E. Hoel

[57] ABSTRACT

The method enables realtime establishment and maintenance of a standard of operation for a data communications network. The process begins by monitoring the network over some period of time to build benchmark data sets. The benchmark data sets contain a standard of operation for the network, which is historically categorized by either traffic type or activity. This standard of operation is accumulated by the intelligent monitoring facilities. After a period of accumulation, the benchmark is used to determine whether data taken from current monitoring activity indicates normal network behavior. Network monitoring information is analyzed using criteria in modules that have an interface to an expert system. The criteria modules evaluate the current monitored data against the prior benchmark collected data. The criteria module determines if the current network operating characteristics are outside the bounds of normal behavior. If they are, then alerts and logs of information can be sent to the expert system. The expert system can perform network control routing changes, or close down applications, or allocate additional bandwidth as required. In addition, the expert system can modify the characterization of the currently monitored data for historical purposes by supplying information to the benchmark manager regarding traffic types, activity, heuristic accuracy and changes between current and past behavior. In this manner, auto benchmarking can be accomplished with self customization, in an improved manner.

23 Claims, 23 Drawing Sheets

U.S. PATENT DOCUMENTS

| | | | |
|---|---|---|---|
| 4,944,038 | 7/1990 | Hardy et al. | 370/85.5 |
| 4,980,824 | 12/1990 | Tulpule et al. | 364/200 |
| 4,999,833 | 3/1991 | Lee | 370/94.1 |
| 5,035,302 | 7/1991 | Thangavelu | 187/125 |
| 5,062,055 | 10/1991 | Chinnaswamy et al. | 364/513 |
| 5,067,107 | 11/1991 | Wade | 395/500 |
| 5,072,376 | 12/1991 | Ellsworth | 395/650 |
| 5,077,763 | 12/1991 | Gagnoud et al. | 377/16 |
| 5,079,760 | 1/1992 | Nemirovsky et al. | 370/17 |
| 5,084,871 | 1/1992 | Carn et al. | 370/94.1 |
| 5,097,469 | 3/1992 | Douglas | 371/20.1 |
| 5,159,685 | 10/1992 | Kung | 395/575 |
| 5,197,127 | 3/1993 | Waclawsky et al. | 395/200 |
| 5,282,194 | 1/1994 | Harley, Jr. et al. | 370/17 |
| 5,317,725 | 5/1994 | Smith et al. | 395/575 |
| 5,332,974 | 7/1994 | Harkins et al. | 324/606 |
| 5,365,514 | 11/1994 | Hershey et al. | 371/20.6 |

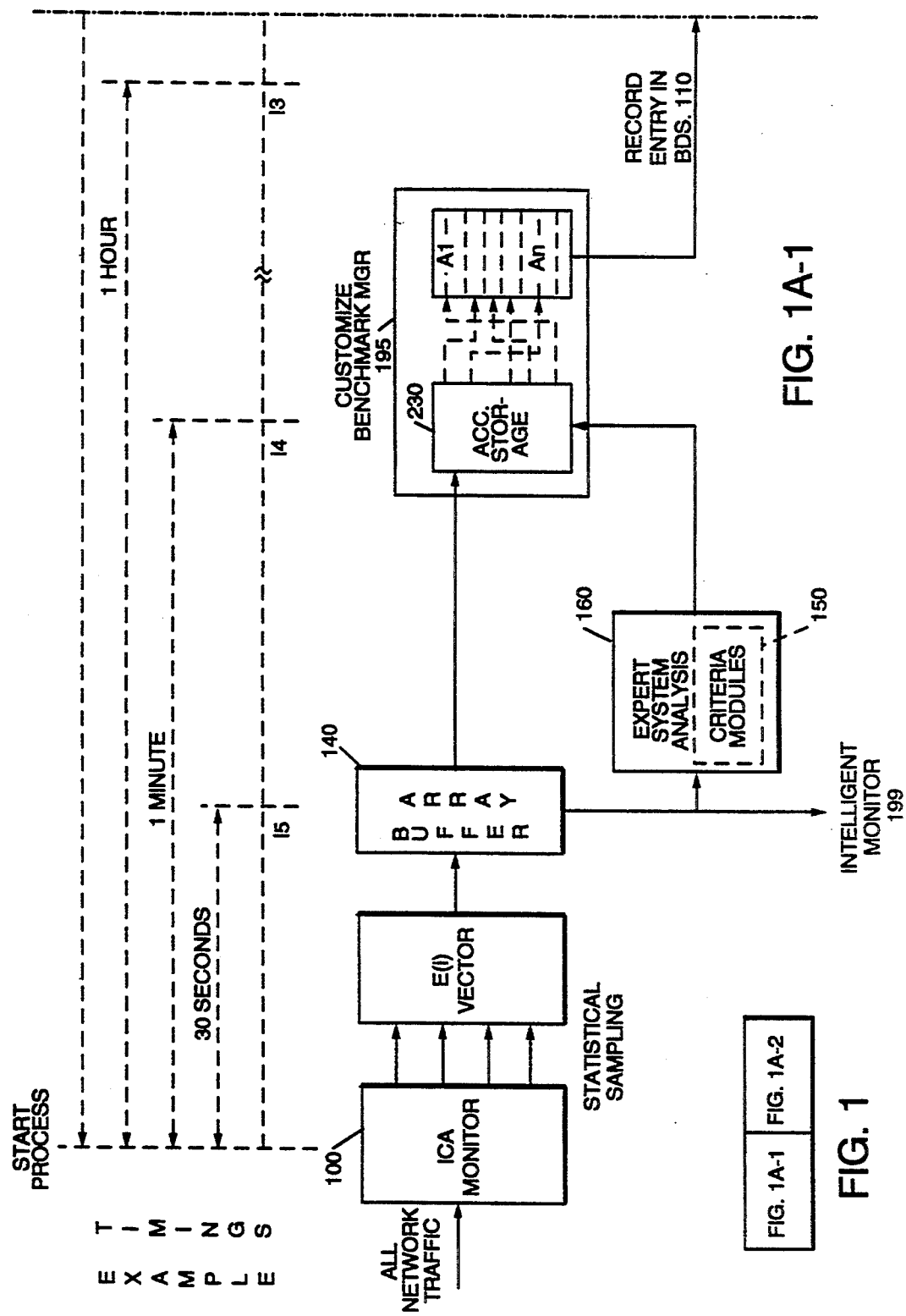

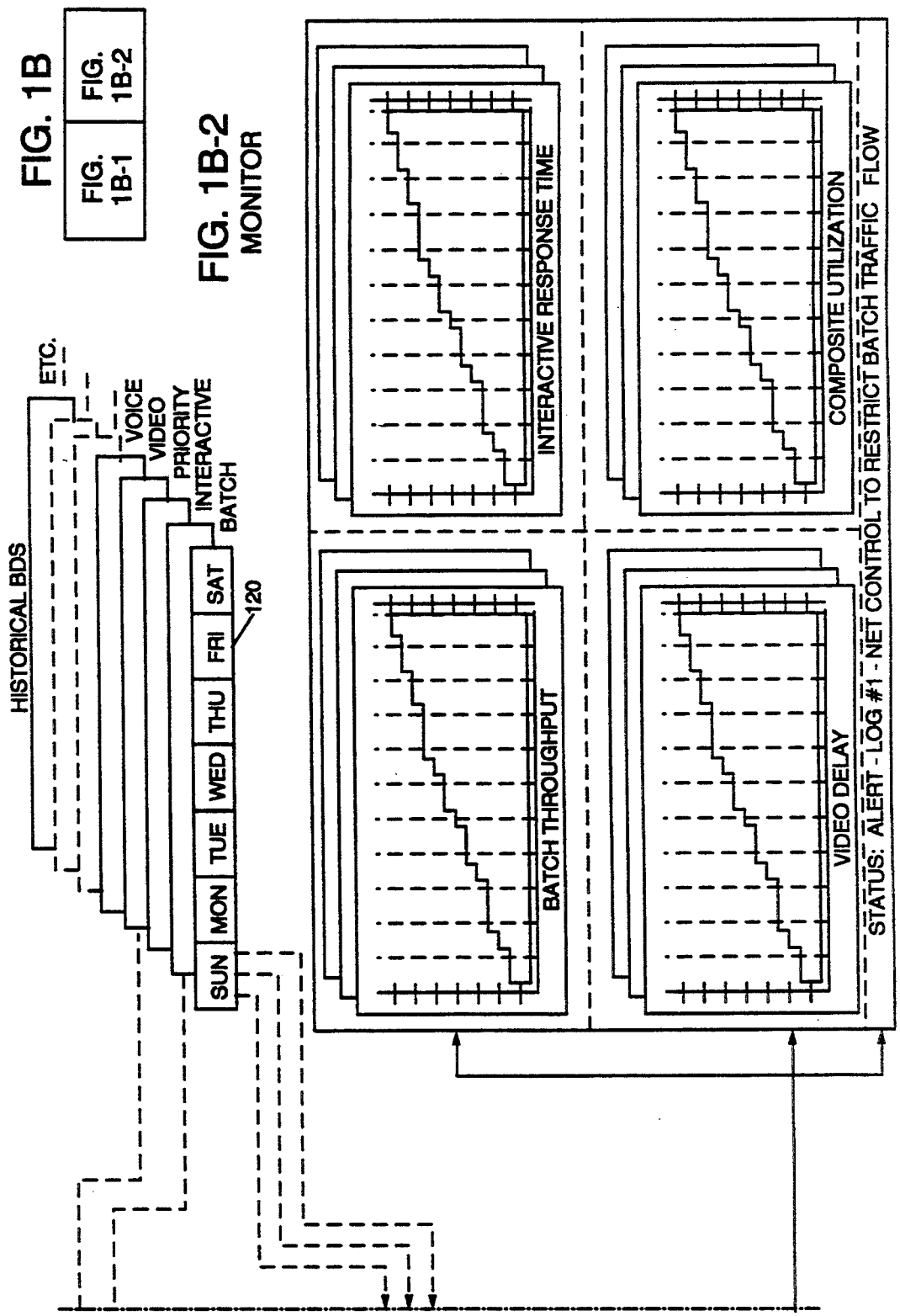

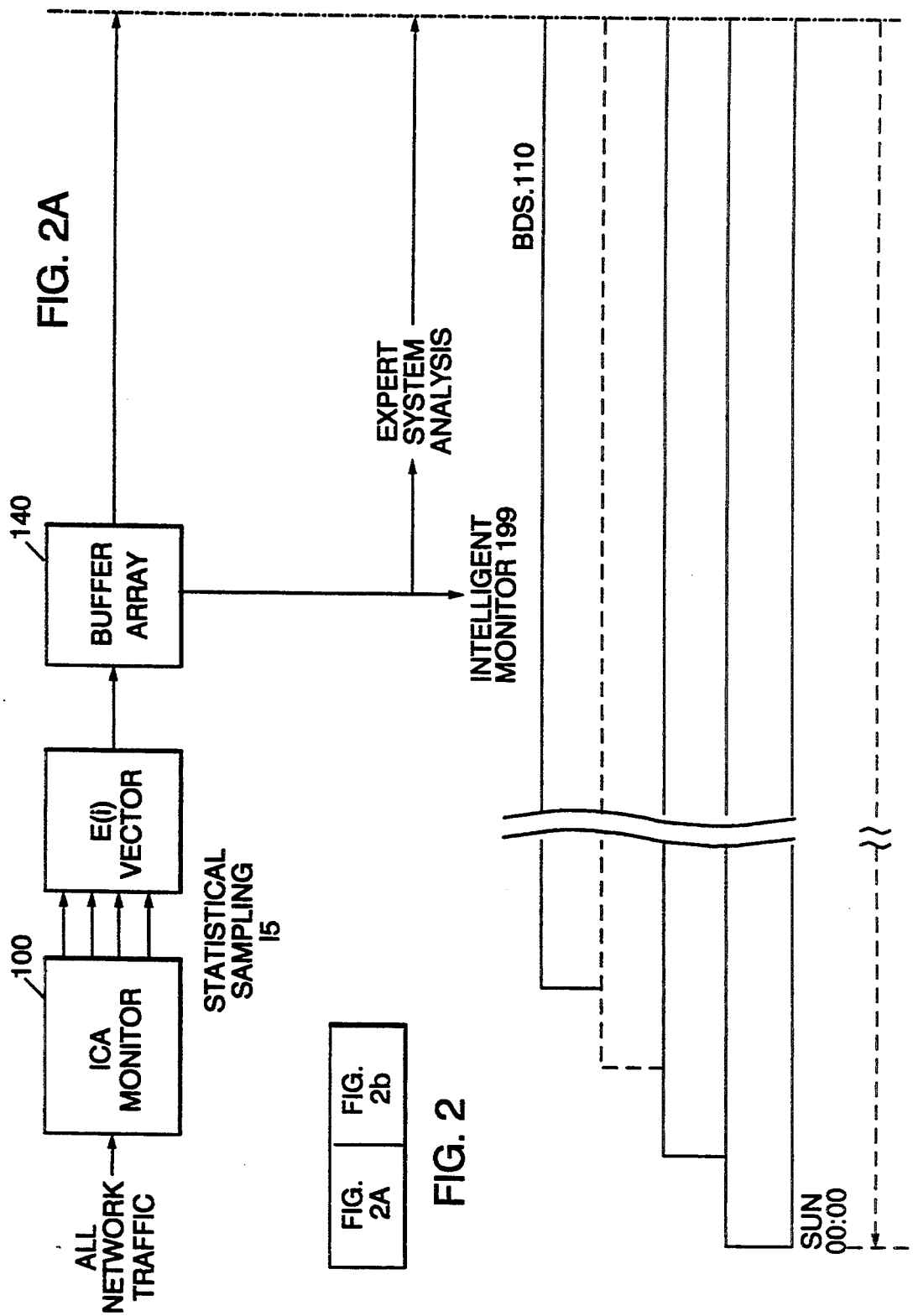

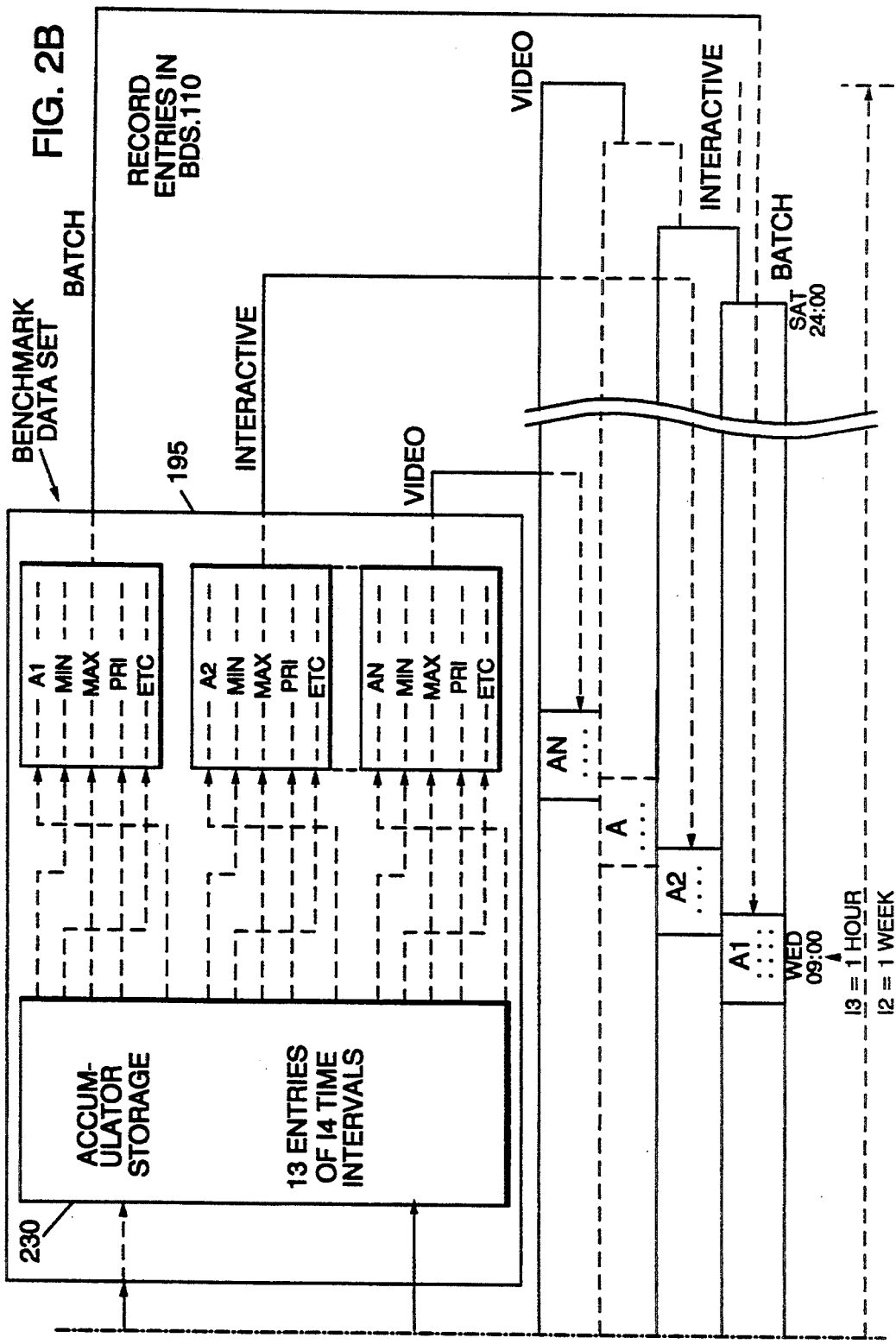

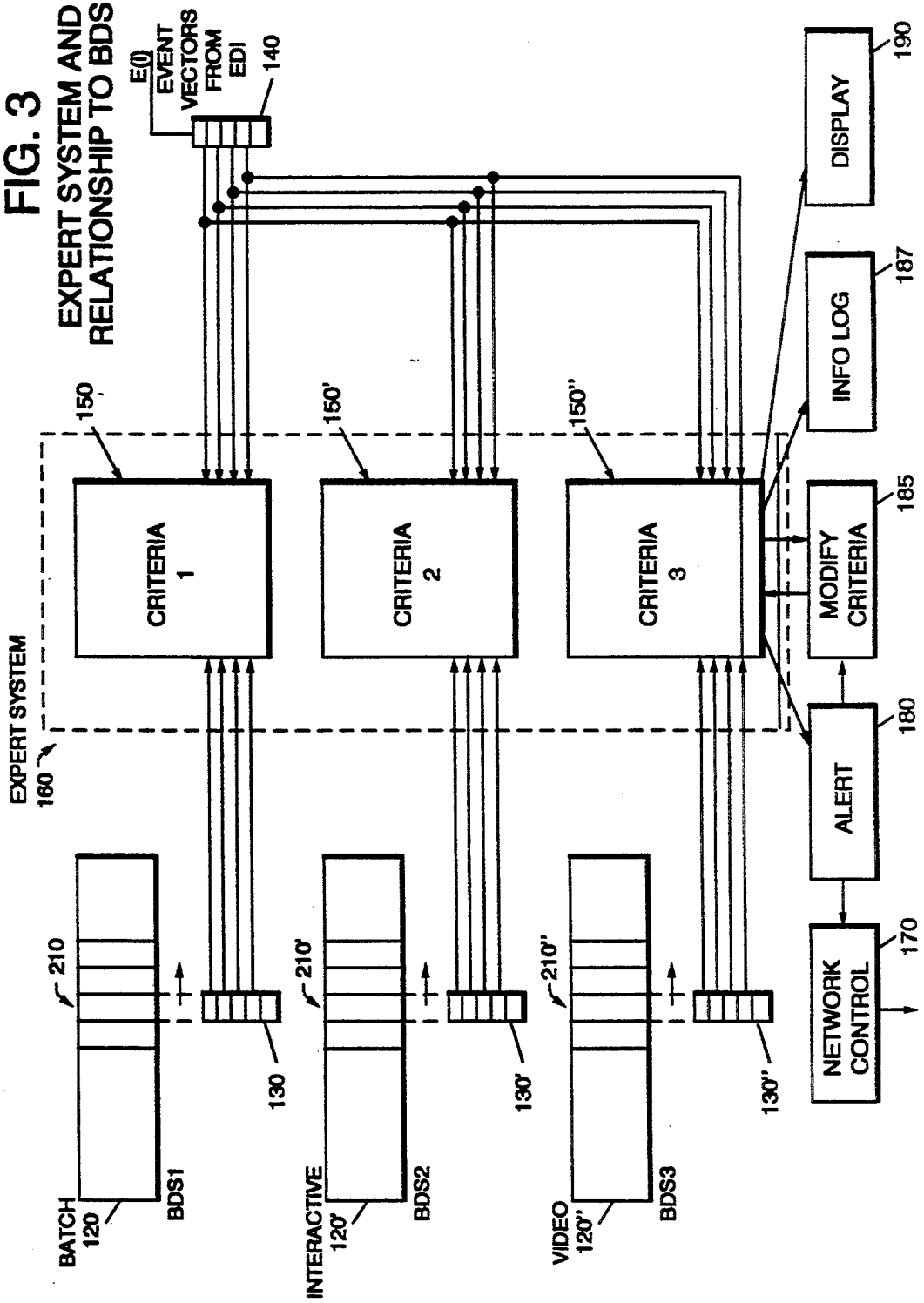

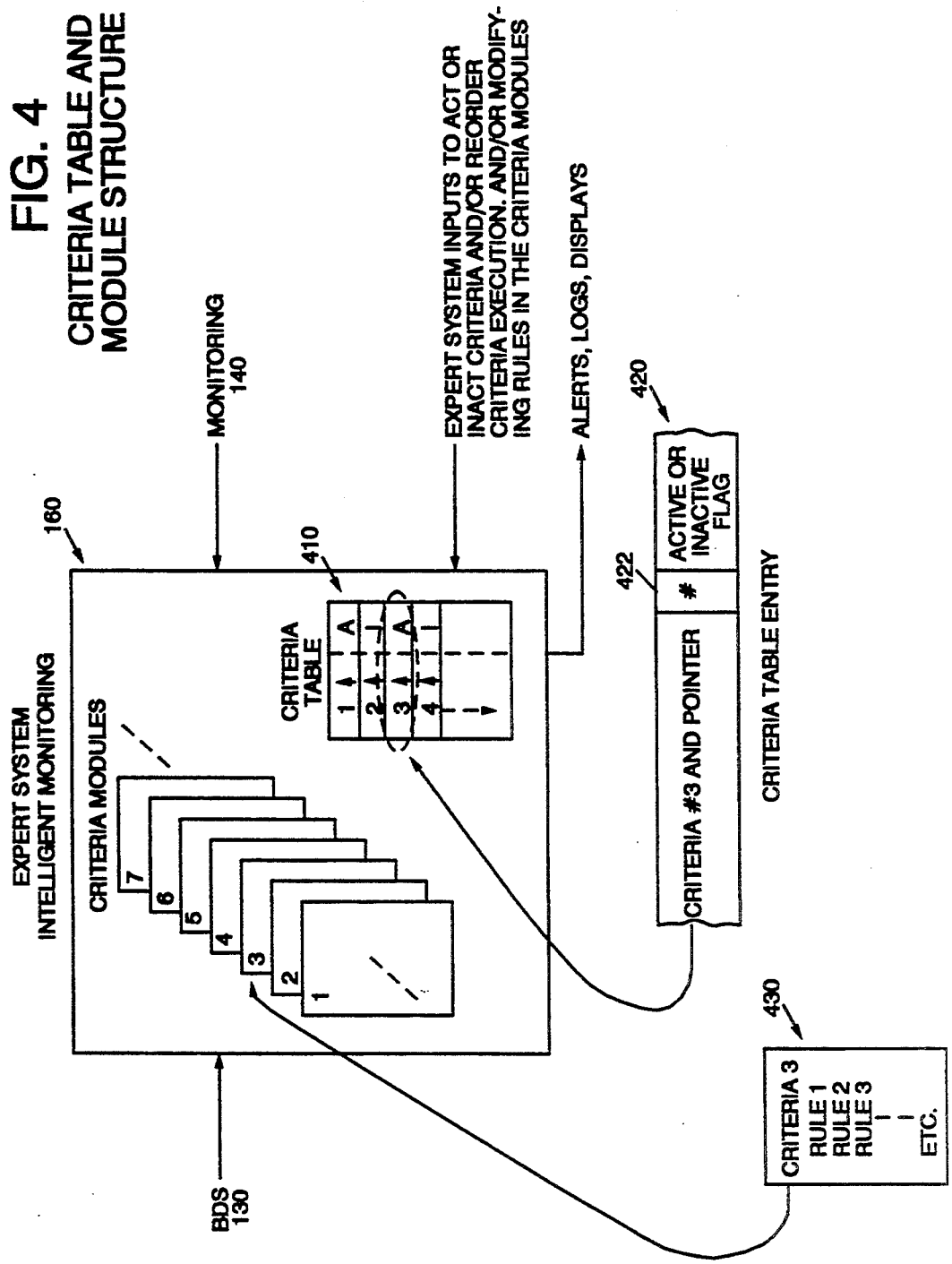

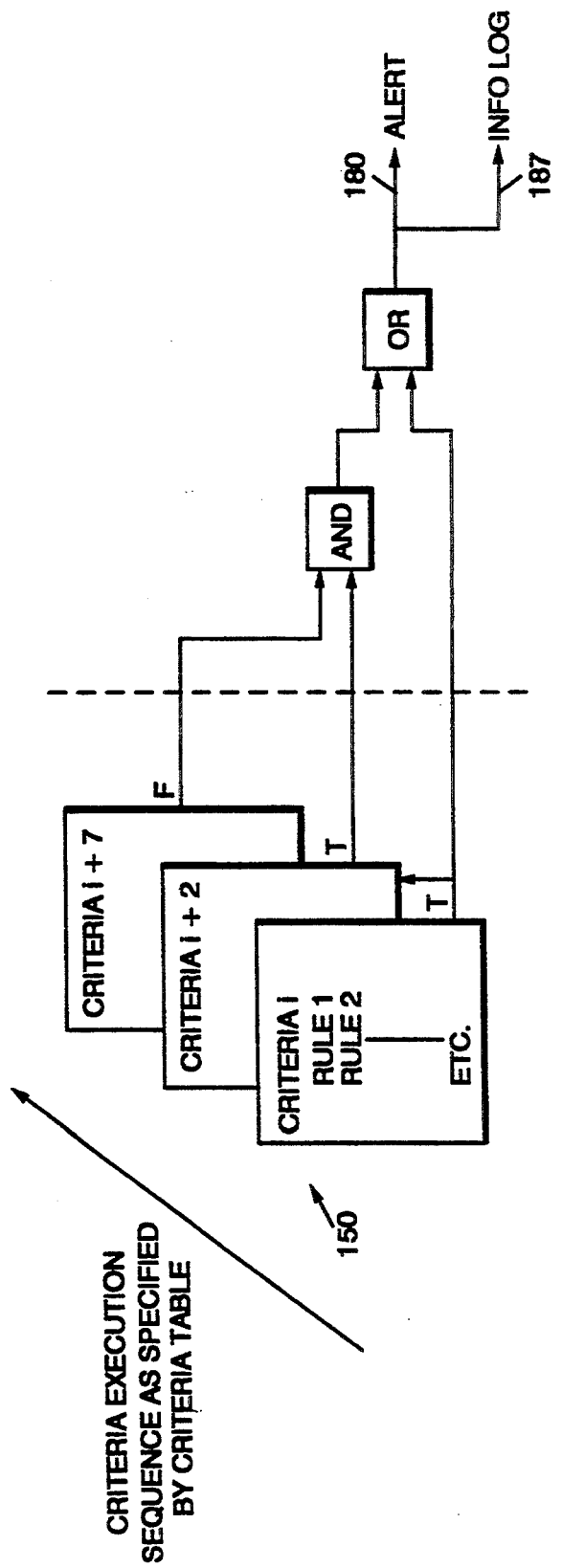

REAL TIME INTELLIGENT MONITORING DISPLAY

REAL TIME INTELLIGENT MONITORING DISPLAY

REAL TIME INTELLIGENT MONITORING DISPLAY

REAL TIME INTELLIGENT MONITORING DISPLAY

REAL TIME INTELLIGENT MONITORING DISPLAY

ILLUSTRATION OF RATIO R, I3, I4, I5

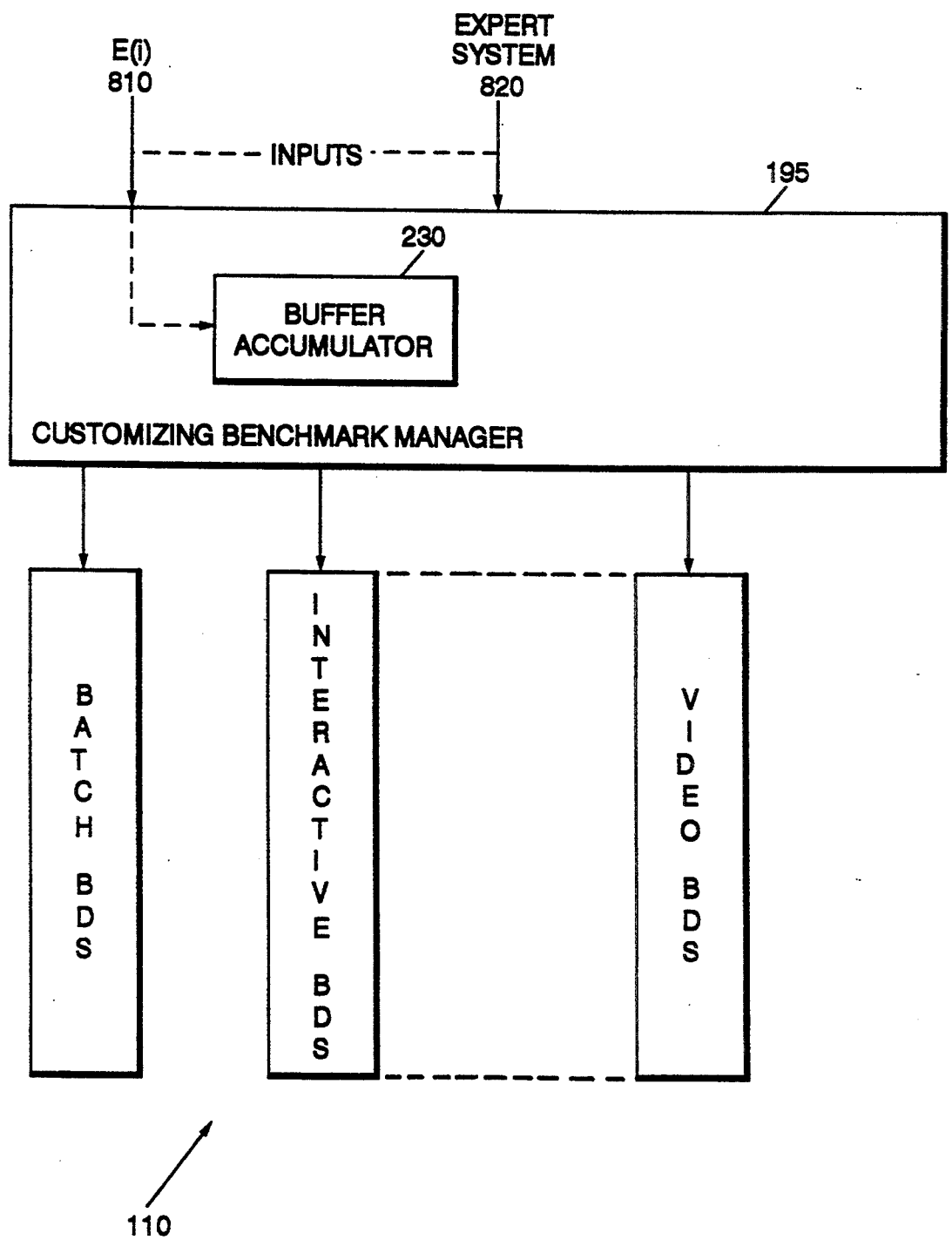

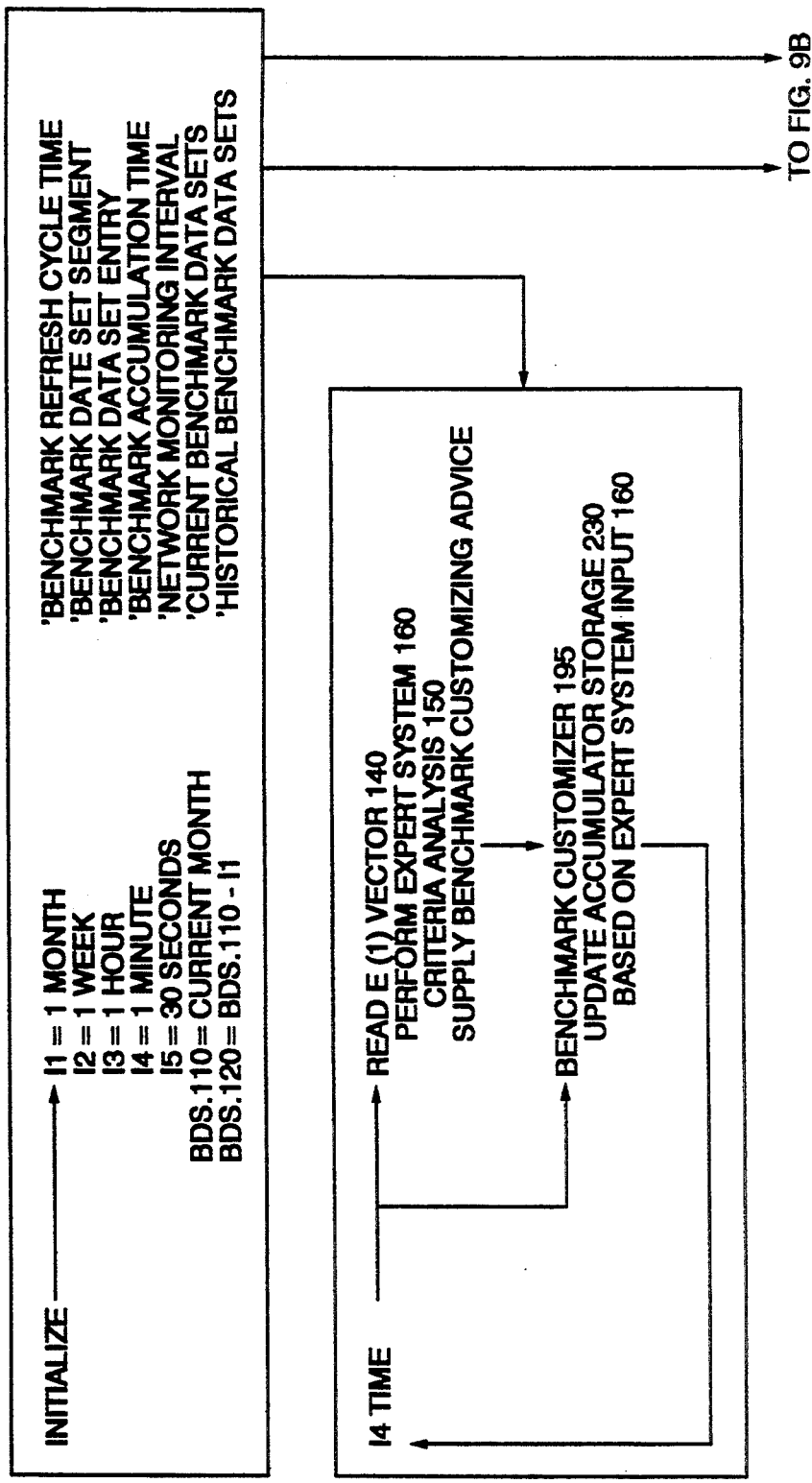

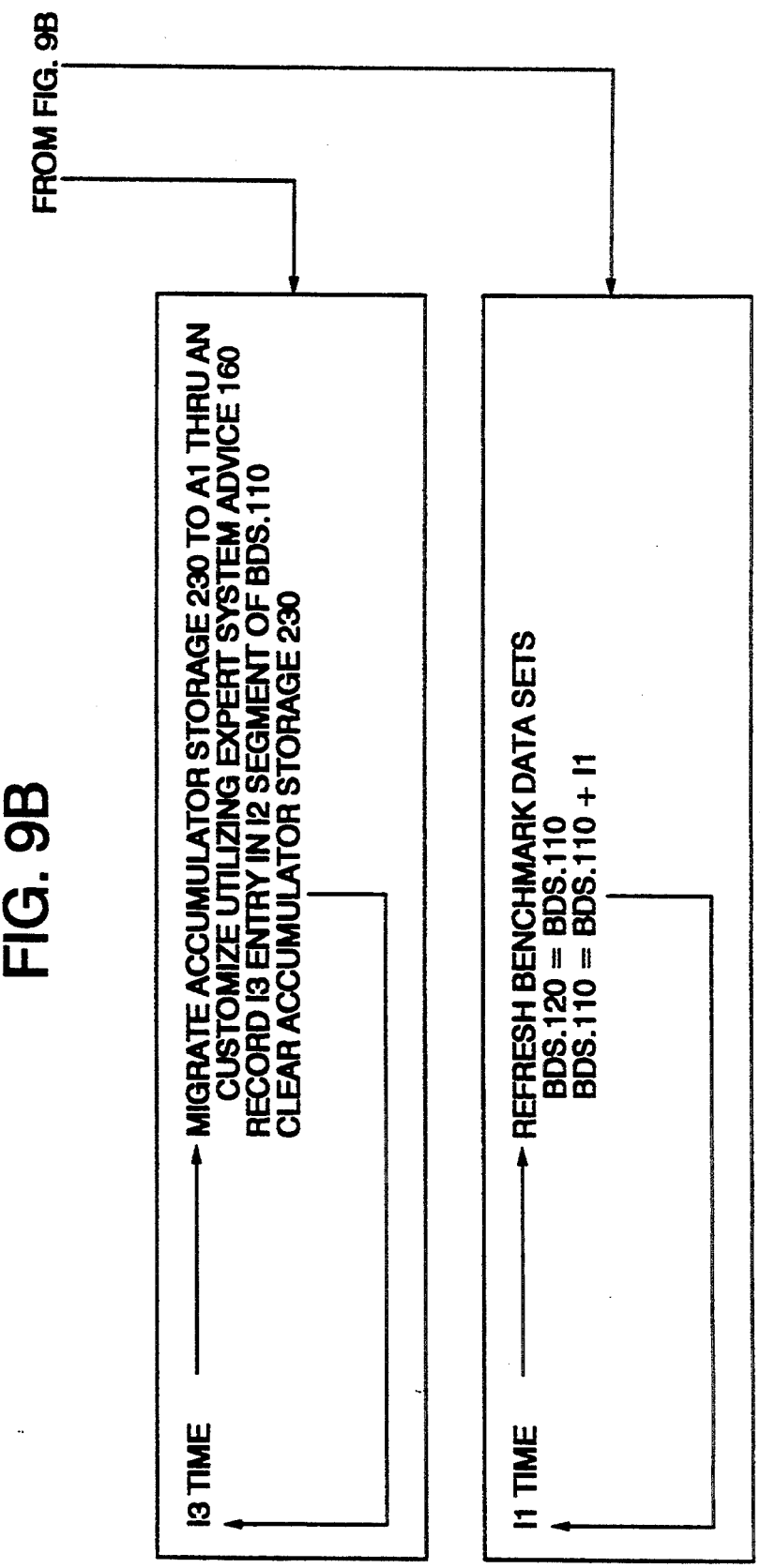

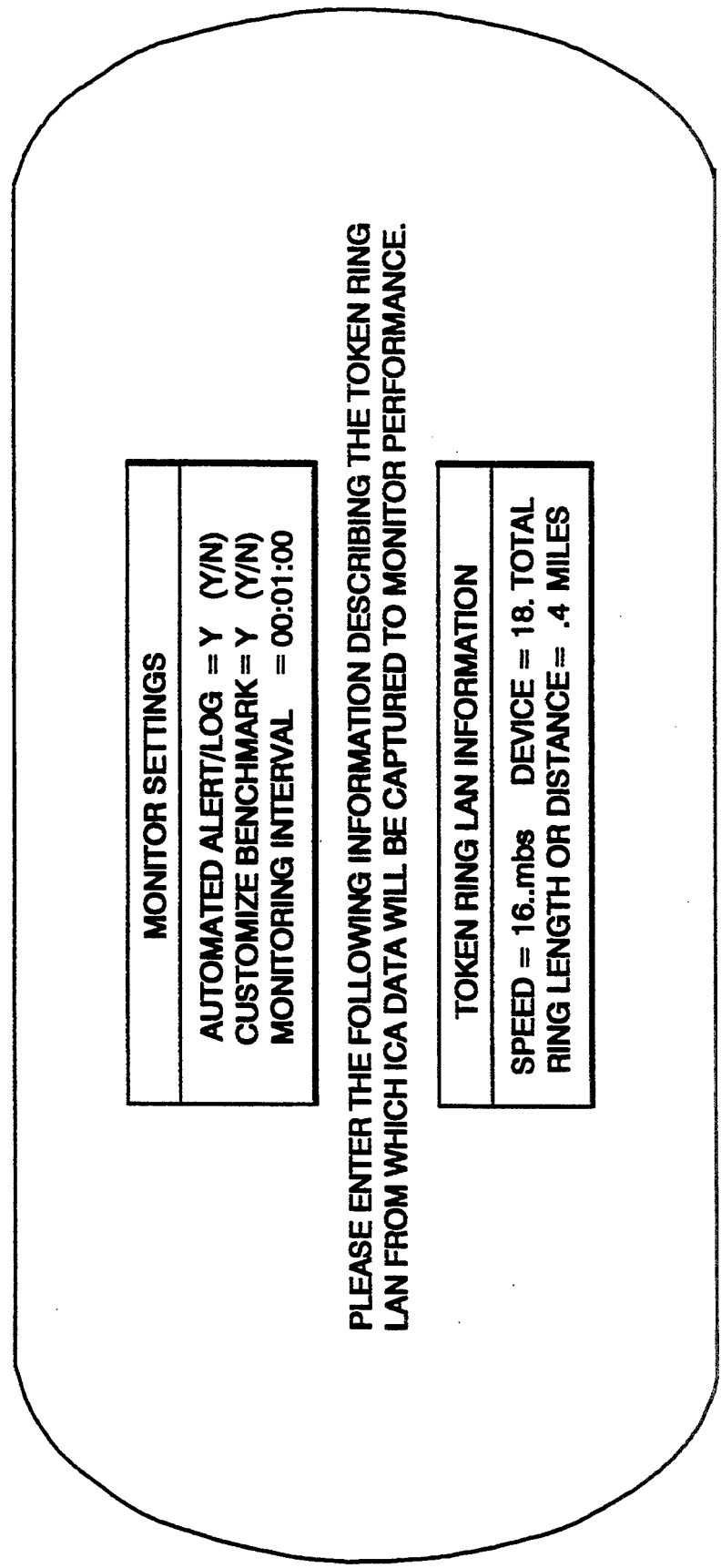

TOKEN RING INTELLIGENT MONITOR

TOKEN RING INTELLIGENT MONITOR

TOKEN RING INTELLIGENT MONITOR

EXPERT SYSTEM FLOW (160)

FOR EACH (E(i)) INPUT VECTOR DO:

SET UP OR MODIFY APPROPRIATE
H OR I VALUES

ENABLE/DISABLE CRITERIA MODULES

REORDER CRITERIA MODULES

EXECUTE ENABLED CRITERIA MODULES (150)

RETURN

AUTOMATED BENCHMARKING WITH SELF CUSTOMIZATION

BACKGROUND OF THE INVENTION

1. Technical Field

The invention disclosed broadly relates to the extraction of information from large bodies of data for high speed communication facilities and is more particularly related to automated benchmarking with self customization.

2. Background Art

This invention is related to the copending U.S. patent application Ser. No. 08/138,045 by P. C. Hershey, et al. entitled "System and Method for Adaptive, Active Monitoring of a Serial Data Stream Having a Characteristic Pattern," assigned to the IBM Corporation and incorporated herein by reference.

This invention is related to the copending U.S. patent application Ser. No. 08/024,542, filed May 1, 1993 by J. G. Waclawsky, et al., entitled "System and Method for Configuring an Event Driven Interface and Analyzing Its Output for Monitoring and Controlling a Data Communications Network," assigned to the IBM Corporation and incorporated herein by reference. The Waclawsky, et al. patent application describes an information collection architecture which allows the conversion of signals in a data communications network bit stream, to be fed back into a monitoring and controlling system to assess and to modify protocol activity for a variety of communications protocols. The protocols handled include Token Ring protocol, ETHERNET protocol, Fiber Distributed Data Interface (FDDI) protocol, System Network Architecture (SNA) protocols, TCP/IP protocols, and SONET protocol, among others.

An example of this is for a token ring performance architecture described in greater detail in copending U.S. patent application Ser. No. 08/024,575, filed Mar. 1, 1993 by P. C. Hershey, et al. entitled "Event Driven Interface for a System for Monitoring and Controlling a Data Communications Network now U.S. Pat. No. 5,365,514 issued Nov. 15, 1994," assigned to IBM Corporation and incorporated herein by reference. This reference describes an expert system driven implementation that constructs a control vector C(i) which is transmitted to a programmable performance vector generator which includes an Event Driven Interface (EDI). The control vector tells the EDI how to organize its logic trees based on the type of protocol being run on a network. The control vector will configure the EDI logic trees to perform digital filtering of binary bit sequences on the network which characterize the protocol, the performance, and from which problem determination information can be inferred. The expert system will specify a format for an event vector E(i) that will be generated by the Event Driven Interface within the Programmable Performance Vector Generator (PPVG), that will provide the requested information characterizing the current condition of the network. The expert system then analyzes the information in the event vector and drives control functions which enable control signals to be issued to the network to modify network load, perform load balancing and load distribution, do problem determination, modify network routing, or to provide other customer services. The expert system can issue control vectors C(i) to collect additional information to perform problem determination and analysis to identify and analyze temporary failures and performance degradation on the network. The expert system can perform performance monitoring to identify when a performance factor of a network component exceeds a predefined threshold. The expert system can perform benchmark testing of an application running on the network with respect to its functions, reliability and performance objectives. The expert system can initiate performance tuning and optimization of the network to improve the efficiency of the network or other network components. The expert system can perform a workload analysis and prepare a report to identify both application and protocol-related workloads, i.e., how much network traffic is useful information and how much is protocol-related, where the noisiest nodes are in the network and the amount of incoming and outgoing traffic flow to the network. The expert system can provide network sizing information to guarantee a workable solution for a particular customer application, based upon forecast traffic patterns. The expert system can provide input information for load balancing, load distribution and network control. The principle of operation of the expert system and Programmable Performance Vector Generator combination is also applied, to additional communications protocols such as Ethernet protocol, FDDI protocol, SNA protocols, TCP/IP protocols or the SONET protocol.

The invention finds application within the Information Collection Architecture which is further described in the above referenced Waclawsky, et al. patent application. The Information Collection Architecture extracts information characterizing all data communications network environments, especially those that are high speed and/or complex network environments. The Information Collection Architecture is an enabler that provides a unique physical layer based window into both physical and logical network activity. It can significantly improve the functions, and services and management of any data communications network. It is independent of communications protocols, standards, and physical media. The Information Collection Architecture invention is physically connected to an existing data communications network to monitor the high speed messages which are transferred over the network. The Information Collection Architecture includes a feedback connection which can be used to provide control signals back to the data communications network to modify the behavior of the network in response to monitoring data messages on the network. The Information Collection Architecture performs the functions of real-time identification of events which occur on the network and prepares summaries of correlated event behavior from the network. The Information Collection Architecture provides correlated data and does not go through any data decompression or reconstruction process. This differs from prior techniques of data compression and sampling. The Information Collection Architecture invention performs an examination of only the frequency of occurrence of selected bit patterns, unlike prior trace techniques which require processing for the examination of all network data to determine performance metrics. The Information Collection Architecture permits all traffic to be monitored so that no information goes unseen, which is distinct from prior filtering techniques which permit only a portion of the network traffic to reach the network monitor for analysis. The Information Collection Architecture includes an organized collection of hybrid data reduction vectors and their associated services. These services include performance monitoring, performance tuning and optimization, benchmarking, problem determination, workload analysis and reporting, network sizing, load balancing, load distribution, network control, network accounting and network management functions. These services are provided for a large variety of data communications networks.

It would be useful to provide a means for establishing benchmarks for the behavior of data communications networks so that valid criteria can be made available to the expert system of the Information Collection Architecture to enable the monitoring and controlling of the data communications network based upon relevant standards of behavior for the network.

OBJECTS OF THE INVENTION

It is therefore an object of this invention to provide a technique for establishing relative benchmarks for the behavior of a data communications network, in an improved manner.

It is still another object of the invention to provide a means for establishing relative benchmarks for the varying behavior of a data communications network, useful in expert system monitoring, analysis and control of the data communications network, especially multimedia environments.

SUMMARY OF THE INVENTION

These and other objects, features and advantages are accomplished by the invention. The invention is a method and system to enable realtime establishment and maintenance of a standard of operation for a data communication network. The process begins by monitoring the network over some period of time to build benchmark data sets. The benchmark data sets contain a standard of operation for the network, which is historically categorized by either traffic type or activity. This standard of operation is accumulated by the intelligent monitoring facilities. After a period of accumulation, the benchmark is used to help determine whether data taken from current monitoring activity indicates normal network behavior. Network monitoring information is analyzed using criteria in modules that have an interface to an expert system. The criteria modules evaluate the current monitored data against known standards 0f operation and prior benchmark collected data. The criteria module determines if the current network operating characteristics are outside the bounds of normal behavior. If they are, then alerts and logs of information can be sent to the expert system. The expert system can perform network control routing changes, or close down applications, or allocate additional bandwidth as required. In addition, the expert system can modify the characterization of the currently monitored data for historical purposes by supplying information to the benchmark manager regarding traffic types, activity, heuristic accuracy and changes between current and past behavior. In this manner, auto benchmarking can be accomplished with self customization, in an improved manner.

DESCRIPTION OF THE FIGURES

These and other objects, features and advantages will be more fully appreciated with reference to the accompanying figures.

FIG. 2 is an example of benchmark data set structure, in accordance with the invention.

FIG. 3 is a schematic block diagram of an expert system and its relationship to the benchmark data set, in accordance with the invention.

FIG. 4 is a schematic illustration of the criteria module structure and the table structure.

FIG. 5 is a schematic diagram of the criteria module outputs.

FIG. 8 is a schematic block diagram of the customizing benchmark manager.

FIG. 9 is a flow diagram of the automated benchmarking cycles.

FIGS. 10A-10F show example display screens for the Intelligent Realtime Monitor.

DISCUSSION OF THE PREFERRED EMBODIMENT

The invention is a method and system to enable realtime establishment and maintenance of a standard of operation for a data communications network. The standard is a data set which includes network activity which is historically categorized by traffic type and by activity.

Figures 1, 1A, 2:
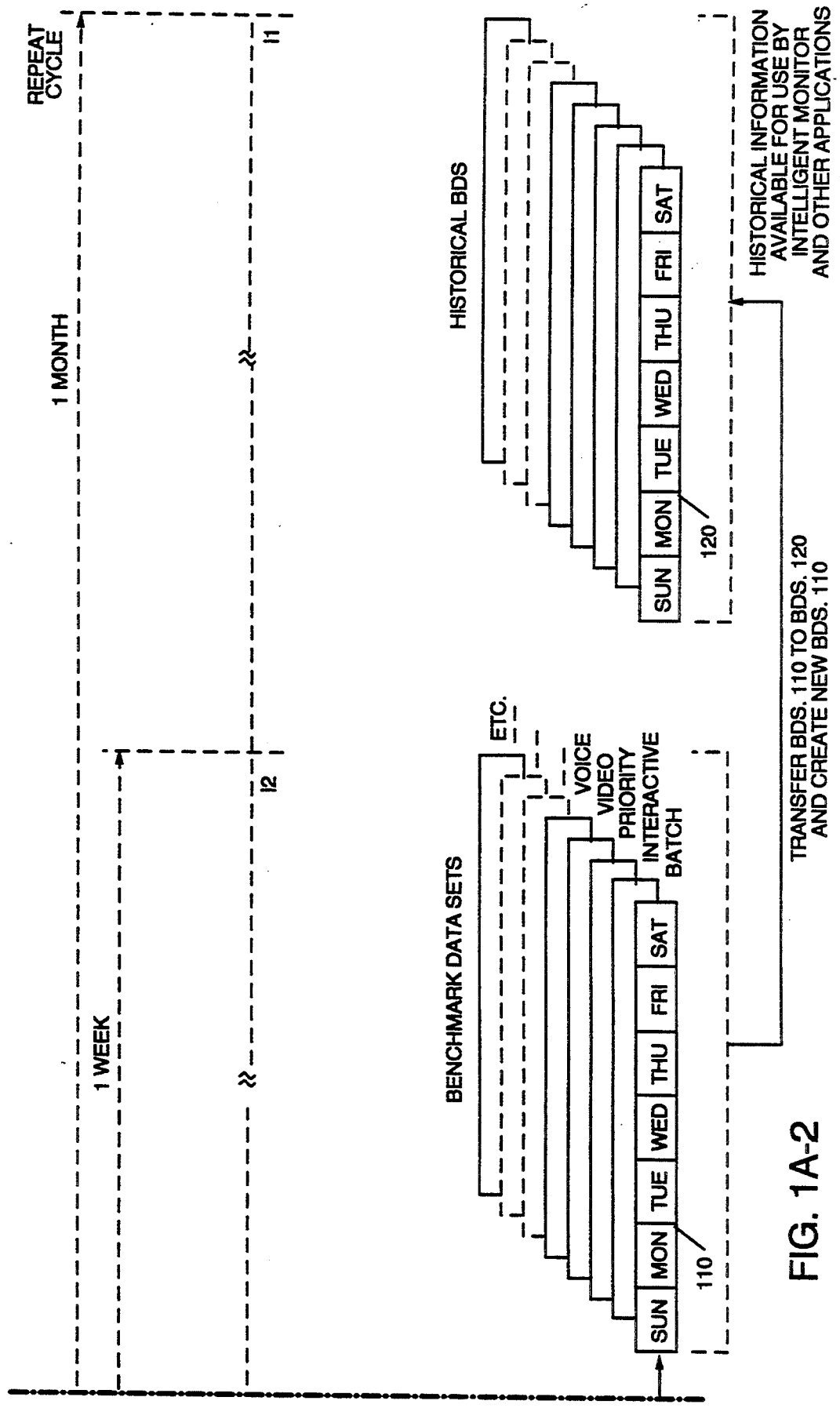
FIGS. 1A-1 1A-2, 1B-1 and 1B-2 are overall process sequence diagrams illustrating the concept of the invention.
Figures 1, 1B:
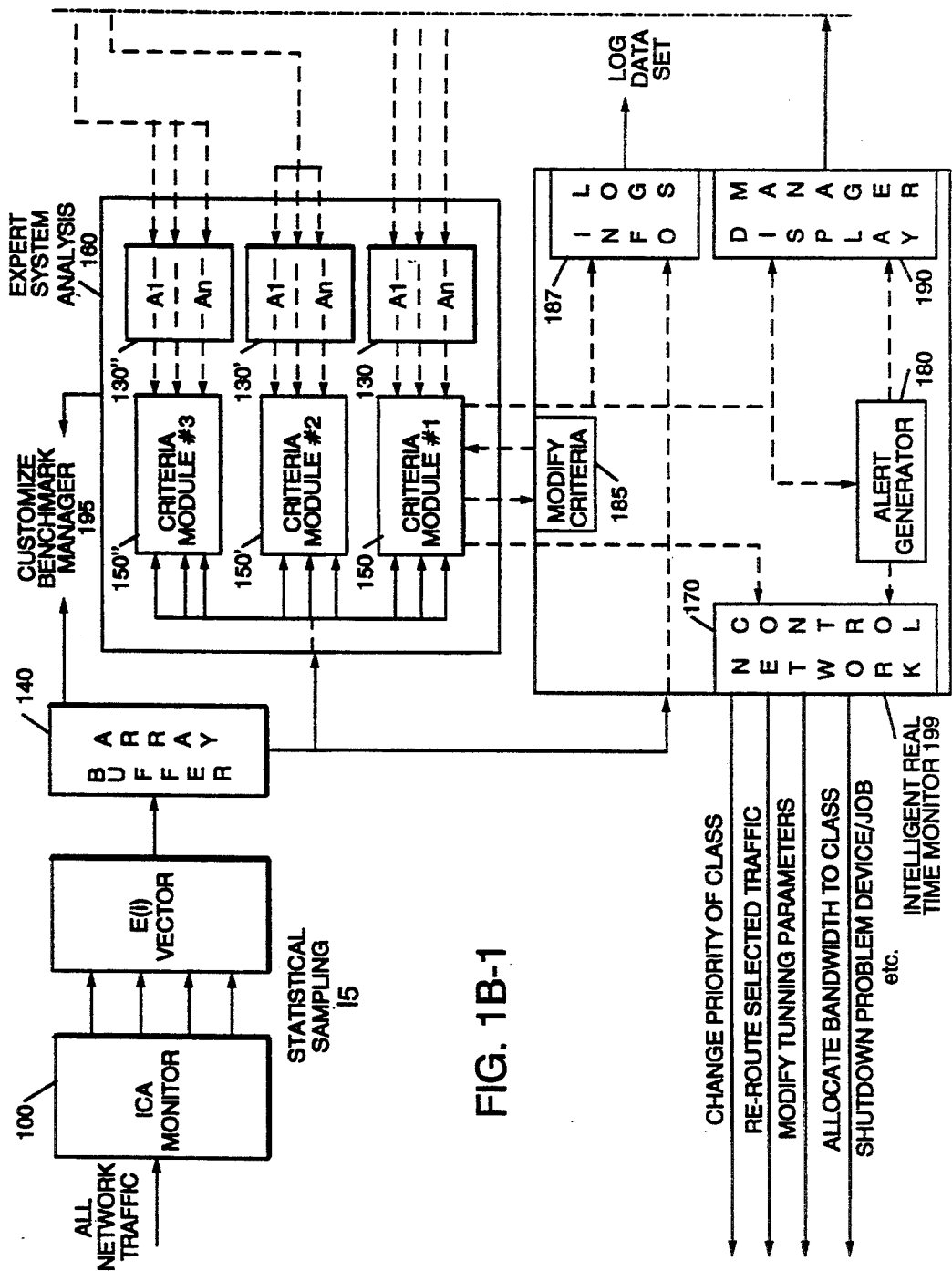

FIGS. 1A and 1B describe the overall functional organization of the invention, FIG. 1A concentrates on the automated benchmarking with a self-customization feature and FIG. 1B focuses on the Intelligent Realtime Monitor feature. In FIG. 1A it is seen that the Event Driven Interface of the information collection architecture monitor 100 which is connected to the communications network being monitored, accepts event vectors which are transferred to the buffer array 140. Reference to Table 1 will illustrate example event vectors such as those which are generated by the Event Driven Interface described in the copending U.S. patent application Ser. No. 08/024,575, filed Mar. 1, 1993, which is cited above. The event vectors shown in Table 1 characterized batch traffic which starts and stops using the size and the frame rates and queuing status using the maximum frames per rotation (MFR) column. It can be seen in Table 1 that at line A, the number of frames is 682 and the maximum frame size is 103 bytes whereas at line B which is many minutes later in time, shows the number of frames being over 6000 and the maximum frame size being over 1000 bytes. Line B is near the middle of a burst of batch traffic that has been detected in the network. This is just one of many examples of the kind of information which is provided by the event vectors which are input to the buffer array 140. The buffer array 140 then outputs information derived from the event vectors to the accumulator storage 230 in the customized benchmark manager 195. The information from the event vectors is also output from the buffer array 140 to the expert system analysis module 160. The output from the buffer array 140 is also applied to the Intelligent Realtime Monitor 199 shown in FIG. 1B.

The customized benchmark manager 195 includes the accumulator storage 230 which accumulates the information from the event vectors. The expert system analysis module 160 contains the rule based criteria modules 150, 150' and 150", which contain rules which will characterize the classes of traffic on the network being monitored. Classes of traffic can be for example batch traffic or interactive traffic or voice traffic or video traffic, for example. In batch traffic, rules can be provided in the rule based criteria modules 150 to characterize the size of the packets in the batch, the burst activity, the priority of the traffic. Other rule based criteria modules 150 can characterize interactive traffic or accounting information or other characteristics which are important to the monitoring and control of the network.

Event vectors received in the buffer array 140 and applied to the expert analysis module 160, will have the information represented by the event vectors compared with standards of behavior for the network. The comparison is performed by the rules contained in the rule based criteria modules 150. The standards can be predetermined, predefined standards such as average utilization for particular types of traffic such as batch traffic, interactive traffic, voice traffic or video traffic. Another important type of standard is the benchmark data set which is the accumulated history of behavior of traffic on the network, as it has been monitored by the system shown in FIGS. 1A and 1B. The benchmark data sets 110, in accordance with the invention, can progressively accumulate a more accurate representation of the expected behavior for the network and that standard can be substituted for the predetermined standard used by the rules in the rule based criteria modules 150.

The rule based criteria modules perform a comparison between information derived from the event vectors in the buffer array 140 and the standards provided by either the predetermined standard values or the benchmark data sets 110, and output inference signals. Those inference signals will be associated with the class of traffic such as batch or interactive or voice or alternately can be classes of traffic such as packet sizes, node identifications or other user-defined classifications. The inference signals are used in a variety of ways, in accordance with the invention. The inference signals output from the rule based criteria module 150 can be applied to the Intelligent Realtime Monitor 199 in FIG. 1B, to present to the user a realtime graphical representation of the behavior of the various classes of traffic being monitored on the network. For example, a specific graphical characterization of batch throughput can be shown to the user which results from the application of rule based character module 150 which characterizes the batch traffic on the network. Further in accordance with the invention, the Intelligent Realtime Monitor 199 can respond to inference signals output from their rule based criteria module 150, to output network control signals 170 to control devices connected to the network being monitored, to modify the packet sizes or routings or other operational characteristics of the network in response to the monitor behavior of the network, through the Intelligent Realtime Monitor 199.

Still further in accordance with the invention, the expert system analysis module 160, and its rule based criteria module 150, can output control signals to the customized benchmark manager 195 in FIG. 1A, to store information from event vectors in the buffer array 140, in benchmark data sets 110 which are specifically customized to the particular traffic class under investigation. For example, a first rule based criteria module 150 can identify batch traffic on the network, and will direct information from the event vectors in the buffer array 140 corresponding to that batch traffic on the network, to a corresponding benchmark data set 110 which is specifically customized to store and archive batch traffic information such as packet sizes, rates, duration of transfer, time of day, . . . etc. Other benchmark data sets 110 can be set aside for the accumulation of monitored information characterizing interactive traffic classes or voice traffic classes or video traffic classes or other classes of traffic on the network.

Still further in accordance with the invention, rule based criteria modules 150 are provided in the expert system analysis module 160, to identify a first traffic class on the network, and to output an inference signal which will access a corresponding first class rule based criteria module 150' which is more closely suited to the analysis monitoring and control of the first class of network traffic. This substitution or swapping of rule based criteria modules is performed by the modified criteria function 185 in the Intelligent Realtime Monitor 199 shown in FIG. 1B.

Still further in accordance with the invention, benchmark data sets 110 can be accumulated over a period of time, for example a period of one week which is represented as I2 in FIG. 1A. As each new one week period of benchmark data set information is accumulated, it can be set aside for future use. A rule based criteria module 150" can be provided in the expert system analysis 160 of FIG. 1B, to detect the current system date and in response to the detection of a new month, for example, the rule based criteria module 150" can change the benchmark data set used for comparison by the expert system analysis 160, from a current month 110, to a next month 120, as is shown in FIG. 1A. For example, if the date is June 30 and the benchmark data set used for the comparison operations in expert system analysis 160 is the May month benchmark data set, as soon as the expert system analysis 160 determines that the system date is July 1, in accordance with the invention, one example of substitution would be to substitute the June accumulated benchmark data set 120 as the standard now used by the expert system analysis 160 for the performance of comparisons of event vector received from the buffer array 140 for monitoring, control and further benchmark data set accumulation.

Table 2 shows an example of a benchmark data set for May and illustrates the accumulated information on the behavior of the network at one-hour intervals on consecutive days in the month of May. This could be used during the month of June, for example, in performing the comparisons by the rule based criteria modules 150 between the information in the event vectors from the buffer array 140 and corresponding information stored in the benchmark data set 120 which is represented by the contents of Table 2.

FIG. 9 is a flow diagram showing the sequence of operational steps characterizing the sequential accumulation of network behavior information in the form of event vector information in benchmark data sets 110. In FIG. 9, there are several nested loops. The outer loop is the I1 loop over a one-month interval and within that loop is the I3 loop which is a one-hour loop and within the I3 loop is that the I4 loop which is a one-minute loop. As can be seen in FIG. 9, the system is initialized at I1 for one month of this benchmark refresh cycle time. I2 is a one week cycle which is the benchmark data set segment. I3 is a one hour cycle which is a benchmark data set entry. I4 is the one minute cycle which is the benchmark accumulation time. I5 is 30 seconds which is the network monitoring interval. As can be seen in FIG. 1A, the benchmark data set 110 is built during the current month and the benchmark data set 120 is the historical benchmark data set which was accumulated during the prior month and is used in the current months monitoring as the standard for comparison in the rule based criteria modules 150. As further shown in FIG. 9, the loop begins with the I1 cycle which is the one month cycle and refreshes the benchmark data sets by substituting the historical last month's benchmark data set 120 as the standard and it invokes the new benchmark data set for accumulation as the benchmark data set 110 which will have data accumulated in it during the course of the current month characterizing the behavior of the network. The next level of nesting in the flow diagram of FIG. 9 has the I3 time of one hour during which the accumulator storage 230 has accumulated within it information from the event vectors in the buffer array 140. The information is stored using one minute intervals and can be customized using the traffic class information provided by the expert system analysis module 160 as previously discussed. At the end of the one hour interval, the information accumulated in the customized benchmark manager 195 will be transferred to the current month's accumulating benchmark data set 110. The current month's benchmark data set 110 is divided into several traffic classes, each of which will receive corresponding accumulated information from event vectors which have been identified by the expert system analysis module 160 as being associated with that particular corresponding traffic class. For example, batch traffic information accumulated in the customized benchmark manager 195 will be output at the end of every hour I3 to the corresponding benchmark data set partition 110. Then in FIG. 9, the innermost nested loop I4 corresponds to the one minute interval during which multiple event vectors E(i) are received from the buffer array 140 and the rule based criteria module 150 performs the appropriate analysis upon that event vector to characterize its traffic class(es) so that the corresponding traffic class(es) signal can be output to the customized benchmark manager 195 and can also be output to the Intelligent Real-time Monitor 199. Thus it is seen that the nested set of loops represented by the flow diagram of FIG. 9 implements the sequential accumulation of a currently accumulated benchmark data set 110 and the application of a prior month, for example, benchmark data set 120 as the standards for use by the rule based criteria modules 150 in monitoring, controlling and archiving, in accordance with the invention.

FIGS. 1A and 1B show an overall process sequence of the invention. Shown in FIGS. 1A and 1B is a time line of a period of time in which this process is taking place. The process begins with monitoring the network media or some network component over some period of time at 100. Monitoring is done on a specified interval which is called I5. The monitoring information is used to build benchmark data sets. Example benchmark data sets 110 are shown. The benchmark data sets contain standards of operation for the network, which are historically categorized by either traffic type or activity. This standard of operation is continually built by the benchmark manager using the monitoring facilities at 100 with input from the expert system. After some period of time which we refer to as I1, which in FIG. 1 is the benchmark data set refresh interval, the benchmark data sets previously created are employed now in a fashion to allow us to determine whether the data obtained from the current monitoring activity indicates normal or abnormal network behavior. The new benchmark data set may be a combination of old and new data sets which retain accumulated network behavior over very long intervals. The benchmark data set shown as 120 in FIG. 1A contains information over some time span of monitoring activity. This benchmark data set time span is referred to as interval I2. Each interval entry of the benchmark data set, which is referred to as benchmark collection interval information, is data about an interval of time within the benchmark data set time span. This is referred to as I3. A description of one embodiment of the benchmark data set is as follows. The smallest entity in the benchmark data set represents information collected over a typical I3 interval (e.g. one hour). These entities are then organized into entries that reflect the typical time span covered by I2 (e.g. one week). Finally, the entire benchmark data set represents a typical network traffic patterns for a complete I1 refresh cycle. The benchmark data collection interval shown as 130 in FIG. 1B is compared to the information coming from the current monitoring interval which is 140. This information is compared using criteria that are in modules 150 that have an interface to an expert system 160. This is the expert system described in the above cited Waclawsky, et al. patent application. The criteria modules are responsible for evaluating the current monitored data from 140 against the prior benchmark collected data at 130 during subsequent intervals, for example intervals of the same hour in the same day of different weeks. The criteria module determines if the current network operating characteristics are outside the bounds of normal behavior. If they are, then alerts and logs of information can be sent to the expert system and the expert system can then effect some network control shown as location 170 which are modules 170 out in the network that the expert system can communicate to effect either routing changes to close down applications, adjust tuning parameters, alter priorities, or to allocate additional bandwidth as required due to the fact that there is some condition in the network that the network needs to be corrected or optimize for. In this manner, auto benchmarking can be accomplished with self customization, in an improved manner.

The expert system 160 will output the appropriate network control information to network control locations designated as 170 in FIGS. 1A and 1B. The expert system can modify either the network or the criteria modules based on what it sees by the monitoring facility passing data from 100 to 140 and comparing the data 140 with those from the historical benchmark collection data in 130. The intervals at which data is collected at 100 is specified by time interval I5. The intervals at which data are accumulated within the benchmark data set is specified as I3. The invention features five intervals, to provide complete flexibility. The benchmark data set refresh interval I1, the benchmark data set time span I2, the benchmark collection interval information I3, the duration of the sampling of the intervals that are used to construct the benchmark data set I4 and the active monitoring interval which we have identified as I5. The intervals I1, I2, I3, I4 and I5 can have various relationships between them. In other words, it is not necessary for I3 to be exactly equal to I4 or to I5. Depending on the use of the invention, there can be differing relationships between the intervals and they can be effected by the expert system analysis to dynamically change the characteristics of the benchmark data sets or the criteria modules so that the expert system is better able to control and monitor the network.

It is another feature of the invention to store benchmark data sets to provide a history of network activity over a significant time frame. These benchmark data sets can then be algorithmically extrapolated for capacity planning, trends analysis, etc. by the criteria modules or expert system in the determination of whether the network exceeds (or will exceed in the future) some criteria that indicates a performance problem, or a security violation, or a billing error, etc.

The criteria that are used to evaluate whether the system is operating within some bounds or not, can be specified as two classes of criteria. One class of criteria we could consider fixed, which means that this criteria is generally acceptable criteria for finding known network problems. There could be another class of criteria that would be called dynamic, which the criteria are activated or deactivated due to the unique aspects of the environment in which they are monitoring. For example, if the traffic patterns that we see belong to batch traffic, it does not make sense to monitor this environment for response time or delay characteristics. Each of the criteria would consists of a set of rules which are invoked if the criteria are active. Otherwise, the criteria and the rules would be bypassed if the criteria are specified as inactive. Active or inactive criteria can be kept in a table and the table can specify not only whether the criteria are active or inactive, but can also specify the order of execution of the criteria. By doing this, the criteria tests can be cascaded where the success or failure of criteria I can be used as input to criteria I+1 or I+2 or some other criteria later on in the execution string. The rules that are part of each individual criterion, if they are met will indicate that there is some potential situation in the network that needs attention. That would be done via alerts or logs that are recorded indicating that a particular criterion was satisfied and sent to either an expert system or a management log for further action.

The criteria that are executed and rules within the criteria can be modified by the expert system or some management or control location to force some criteria active and others inactive, based on the information that we see from the active monitoring of the data stream. For example, the expert system or some type of intelligent monitoring code could notice that we have large packet sizes and burst activity that are occurring at no or very low priority usage. That could be indicative of batch traffic, in which case, once that is determined, the criteria used and the heuristics used within the criteria, could be modified by the expert system to allow the determination of appropriate operational specifications of batch traffic, with the knowledge that interactive or multimedia traffic does not exist on the media. If for example, we see smaller sizes of packets and very infrequent activity, then that could easily be labeled interactive traffic. Voice traffic or video traffic would usually consist of a particular size and some kind of constant or regular frequency over long time frames and typically have high priority usage. Since we can identify traffic types this way, and by looking in the header of the traffic itself, we can identify by either source, destination, accounting code, or other information carried within the data itself, we can use this information to cause activation or deactivation of criteria and customizing the heuristics within the criteria that we employ to understand the current operating characteristics of the network. This approach will allow us to reduce the occurrences of erroneous or false alerts and logs and will also prevent the thrashing of network control activity by constantly modify network behavior due to transient traffic spikes. Radical traffic variations can occur, in a multimedia and other environments. Therefore, this approach can be successful in making sure that the network is modified in an intelligent fashion rather than thrashed, due to the presence of very spiky high density traffic volumes that are expected in multimedia environments.

FIG. 2 illustrates building an example benchmark data set structure, in accordance with the invention. The benchmark data set structure (BDS) 110 shown in FIG. 2 is an example which covers a duration I2 of one week, from midnight Sunday morning until the following midnight Sunday morning. The benchmark data set 110 includes consecutive one hour sample segments which are referred to as the benchmark interval information, which are taken over the interval I3, which in this example is one hour in duration. During each one hour interval, data has been collected from the event vectors generated by the Event Driven Interface in the data communications network. The data from the event vectors is characterized as A1, A2, A3 ... in FIG. 2. An example of the type of information which can be accumulated during the one hour interval, is A1 can be the percent utilization which can be characterized as the maximum percent, minimum percent and average percent utilization which has been observed during the one hour interval Tuesday at 9:00 a.m. This information is collected in realtime by the Event Driven Interface and output as an event vector E(i) which is supplied by the monitor 100 shown in FIG. 2. As the information for the one hour segment is accumulated, it can fill a buffer 230 which is set up for the accumulation of information to be placed in the benchmark data set 110 by the customizing benchmark manager shown as 195 in FIG. 8 and FIGS. 1A and 1B. Other categories of information can include priority values observed for messages on the network and this is characterized in FIG. 2. Still other categories can be, for example, the number of bytes of information observed for particular applications having packets communicated on the network during the hour interval, and this would be accumulated in another category such as A17. Information which is accumulated in realtime will be incorporated into the appropriate benchmark data set that is also being buffered for future use. The benchmark data set in this example would have its component data accumulated for consecutive one hour benchmark collection intervals for an entire week I2. The completed buffered information in the benchmark data set for a week can then be set aside until a future time I1 at which it will be invoked as the set of benchmark standards for use as benchmark 120 in FIGS. 1A and 1B.

FIG. 8 shows a block diagram of the customizing benchmark manager 195. The customizing benchmark manager will accumulate the E(i) vectors 810 received from the monitor at the rate of I5 into the buffer accumulator 230. After some time period, I3 for example, the accumulated E(i) information can be used to update the appropriate BDS 110 using expert system supplied information 820 developed by the criteria modules to identify the type of information that can be found accumulated in buffer 230. The customizing benchmark manager can use the expert system supplied information 820 to update the appropriate BDSs 110.

FIG. 2 shows how the monitor 100 can be applied in this example to take 30 second samplings of duration I5 of event vectors E(i) from the Event Driven Interface which is monitoring the data communications network in realtime. Each consecutive 60 second sampling interval I4 can be stored as is shown in FIG. 2 so that a total of 60 consecutive one minute sampling intervals are stored and the monitoring will progress as is shown in FIG. 2 for a duration of one hour.

In FIG. 3, the relationship between the expert system 160 and the benchmark data set 120 and also the criteria analysis operation of the information from the benchmark data set 120 with the realtime sampling information from the event vectors in register 140, is described. Expert system 160 is shown in this example as containing three different criteria modules. Criteria 1 is shown as 150, criteria 2 is shown as 150' and criteria 3 is shown as 150", all of which are contained within or associated with the expert system 160. As can be seen in FIG. 3, there are three corresponding benchmark data sets. The BDS1 shown as 120, the BDS2 shown as 120' and the BDS3 shown as 120", which correspond with the criteria modules 150, 150' and 150", respectively.

In the example benchmark collection interval information, each one hour segment, is loaded from the BDS 120 into the corresponding register 130 for application to the first criteria module 150. The corresponding one hour segment 210' in the BDS2 which is 120' is loaded into the collection interval register 130' for application to the second criteria module 150'. Correspondingly, the benchmark collection interval 210" in the BDS3 which is 120" is loaded into a third register 130" for application to the third criteria module 150".

In this example of the invention, the first BDS 120 can represent normal data network operations, the second BDS 120' can represent other BDS categories which can include batch traffic, interactive traffic, voice traffic, video traffic, accounting information, packet sizes, etc. In accordance with the invention, as the realtime event vectors E(i) are applied from the Event Driven Interface to the register 140 in FIG. 3, they are consecutively compared with the corresponding time interval segment 210 for BDS 120 in the first criteria module 150. From this comparison an inference can be drawn as to whether the data communications network is operating within the limits characterized by the segment 210 in the BDS 120 or whether it is outside those limits. The expert system 160 will perform this analysis and will issue an alert 180 which can result in, network control 170 issuing control signals to the network to modify its operating parameters where necessary, in order to maintain a desired network throughput. Alternately, if the expert system 160, using the first criteria module 150, determines that the character of the traffic currently on the network is qualitatively different from the kind of traffic characterized by the BDS 120, then the expert system 160, in accordance with the invention, can apply a different criteria module, such as the module 150'. For example, if the expert system 160, in analyzing the event vectors in 140, determines that instead of having a normal mixture of traffic on the network for the current one hour segment, there is instead a large volume of low priority traffic, then an inference can be drawn that the network is communicating batch mode traffic. Then in accordance with the invention, the expert system 160 can switch to the second BDS (BDS2) 120' and use the second criteria module 150', which in this example, characterize batch mode traffic. Then by using the second BDS 120' and the second criteria module 150', the system can measure whether the network is exceeding the operating limits established by the benchmark collection interval 210' for the second BDS2 120'.

Similarly, if a different form of traffic is identified either by the identity of the traffic type and the header of the messages on the network or alternately by other behavioral characteristics for the traffic on the network, the expert system 160 can switch to the third criteria module (BDS3) 150" in the corresponding third benchmark data set 120" and load the benchmark collection interval 210" for this current one hour segment, into the register 130" to apply the criteria in the segment 210" to the criteria module 150". The criteria and BDSs can be expanded to address as many traffic types, mixtures, or patterns as necessary in a given network environment.

In this manner, great flexibility is provided in the application of benchmark information to the monitoring analysis and network control of a data communications network which has been previously characterized by the accumulation of benchmark data from past event vectors generated by the Event Driven Interfaces in the data communications network.

It can be seen in FIG. 3 that the expert system 160 is capable of issuing alerts, initiating network control, modifying the criteria in one or more of the criteria modules, entering information into the information log, and displaying information resulting from the comparison of realtime data in the event vectors in register 140 with the archived accumulated benchmark information in the register 130 from the BDS 120.

FIG. 4 shows the criteria module structure and the criteria table. This structure shows a series of criteria modules 150 collected with a criteria table 410 embedded in an expert system based intelligent monitoring scheme which is 160. The criteria modules are organized within a table and the table indicates whether a particular criterion, with its associated rules, is either active or inactive. Each entry of the criteria table 420 indicates the location to criteria via a pointer or some other means within the system and a flag which indicates whether the criteria are active or inactive. In fact, the table entry could be extended to possibly provide a number of execution sequences, in which a particular criterion has triggered, which is labeled 422. Other extensions can be easily accommodated. The criteria table will indicate not only the order of which criteria are executed, but whether they are active or inactive. The individual criteria in a table is shown in 430 and it is a series of rules, which if they are satisfied by the input from the monitoring activity for 140 and the benchmark data set 130, will output a signal indicating whether the criteria have been satisfied or not.

FIG. 5 shows the criteria execution sequence as specified by the criteria table. For example, it is possible for criteria I, if it is true, to input to criteria I+2. That will invoke consideration of additional criteria, as well as the input of the active monitoring information 140 (shown in FIG. 4) and the benchmark data set 130 (shown in FIG. 3 and FIG. 4), to decide whether the criteria are true or false. These lines can be AND'ed or OR'ed within the intelligent monitoring system or the expert system to generate alerts. The expert system itself can input back into the criteria modules in modules 160 shown in FIG. 4, to activate or deactivate criteria and/or reorder criteria execution or modify any rules in any of the criteria modules shown as 185 in FIG. 3.

As is shown in FIG. 3, the expert system 160 has an output to the alert 180. The alert 180 has an output to the network control 170, and has an output to the modified criteria 185. The expert system 160 also has an output to the information log 187, to the display 190, and also to the customizing benchmark manager.

FIGS. 6A–6E show an example display for the realtime intelligent monitoring display 190. The display is a series of informational windows based on activity reported by the various criteria within the intelligent monitoring piece of the expert system. Some of the windows shown are batch traffic 610 in FIG. 6B which indicates throughput characteristics of traffic. Interactive traffic is shown as 620 in FIG. 6C, which shows response time characteristics to the traffic. Video traffic is shown as 630 in FIG. 6E and shows delay characteristics of the traffic. Summarization windows of information can be provided such as 640, 641 and 642, which show total overall utilization of some media or network component, the overall bytes that are transmitted, or the number of bytes transmitted out of certain priorities, sizes or accounting codes. These windows can be dynamically opened on a screen whenever batch, interactive or video traffic exists. Also they can be appended behind currently opened windows to provide additional summary information as criteria are enabled by the expert system from an inactive to an active state. At the bottom of the screen, we can show information about alert status and the categories of alert that are being seen by the expert system. This is shown as 650 in FIG. 6.

Figure 6A:
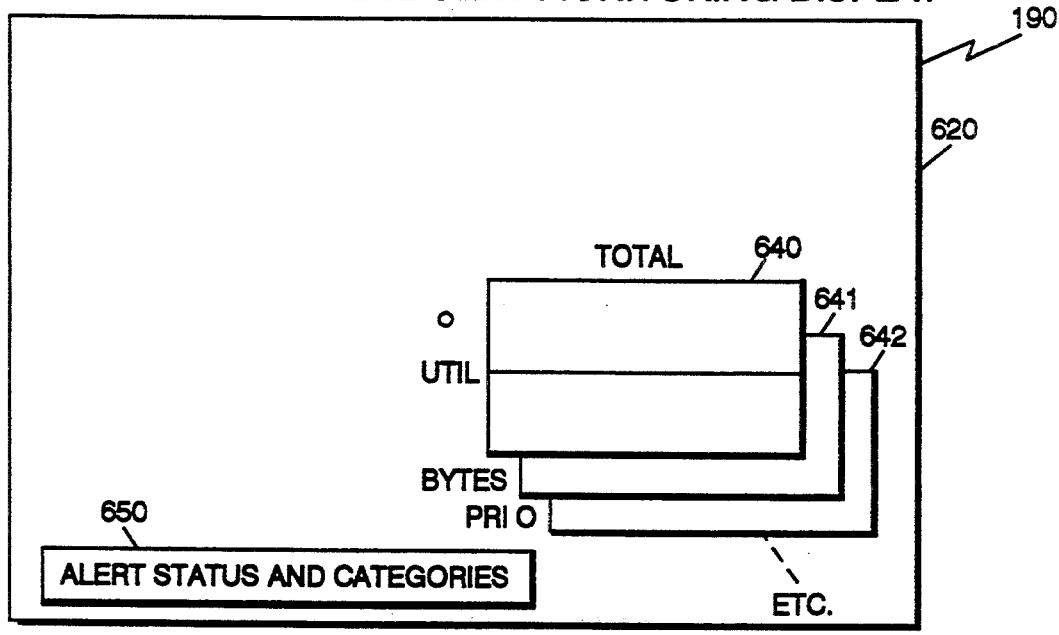
FIGS. 6A-6E are a sequence of illustrations of the realtime intelligent monitoring display.
Figure 6B:
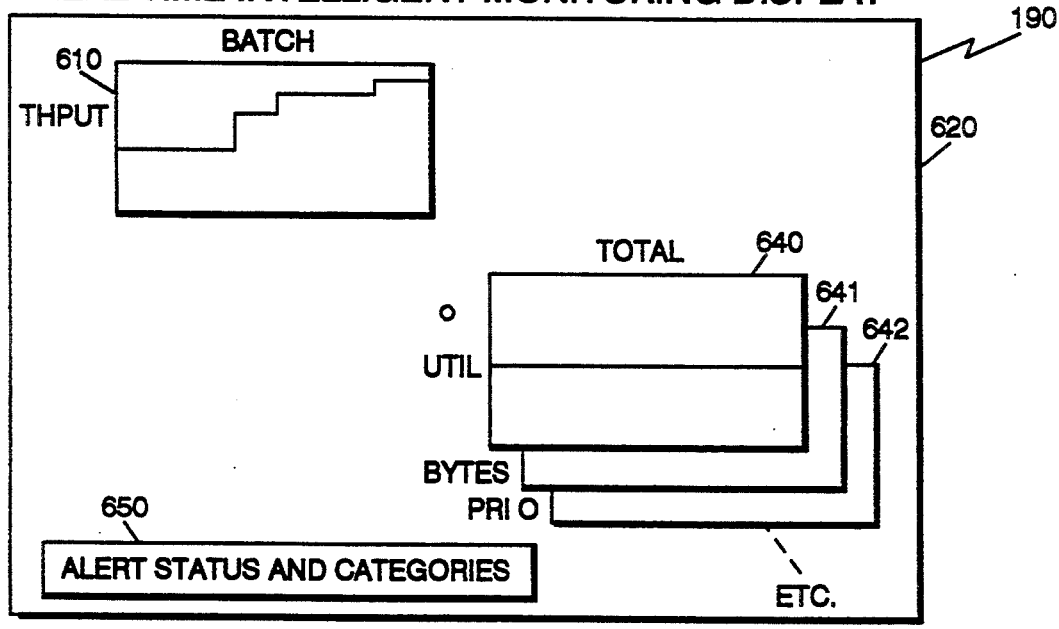

FIGS. 6A–6E show a series of screens from a realtime intelligent monitoring display shown as 190 on FIG. 3. Also for references purposes, it is assumed that in FIG. 3, 120 represents batch benchmark data set information about traffic from batch sources. Reference number 120' represents benchmark data set information about interactive traffic sources, and 120" represents benchmark data set information about video traffic sources. These benchmark data sets are used as input to the criteria modules to compare the historical information in the benchmark data set to the current monitoring information given by the event vectors and analyzed in criteria 1 for batch, for example criteria 2 for interactive and criteria 3 for video. FIG. 6A shows a realtime intelligent monitoring display where the bottom right-hand corner of the display shows 640, 641 and 642. These display information windows represent fixed or generally accepted criteria for monitoring network activity, for example overall utilization of some network component is shown by 640. The total overall number of bytes transmitted by a particular component is shown by 641, the amount of priority zero traffic is shown by 642, priority 1, priority 2, etc. are implied. This area of the screen could be set up to display fixed or generally acceptable criteria results from the monitoring activity.

When traffic is being monitored in the network, an event vector comes in, 140 shown in FIG. 3. This particular event vector shows for example, large packets of a particular size and burst activity, with low or no priority usage. It would satisfy criteria 1 indicating that there exists the presence of batch traffic in the network. This would cause the expert system, when this criterion is satisfied, to place on the screen, the intelligent monitoring display something equivalent to FIG. 6B, which would show the activity of batch traffic being monitored over a time period indicating by interval I5, given in FIG. 2. This information can be displayed to the user during the period of time when batch traffic is present in a network. In addition, the expert system can feed back information to the benchmarking facility about current traffic composition. This information can allow the creation of a particular type of BDS (three types are shown in FIG. 3; 120, 120' and 120") or the update to one or more existing BDSs with benchmark information to be used after time interval I1. If criteria 1 shown on FIG. 3 is satisfied, the output of criteria 1 may also indicate the presence of too much batch traffic, which could generate an alert and provide not only an alert to the screen to be shown on location 650, but could also specify that the alert and the requested information be logged in a file for later subsequent analysis and activity, which is shown as 187 in FIG. 5. This information from the log and the alert can be passed to a network control, shown in FIG. 3, at location 170, that would change network characteristics. For example if too much batch traffic is seen in a network, the source of the batch data could be forced to lower its priority or in fact be turned off.

Figure 6C:
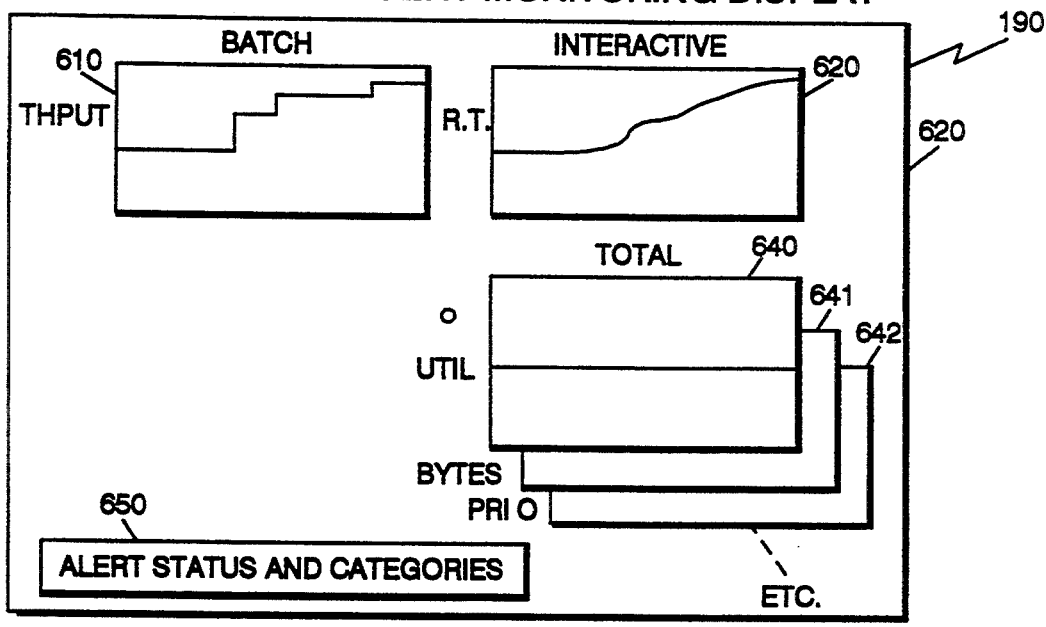
Figure 6D:
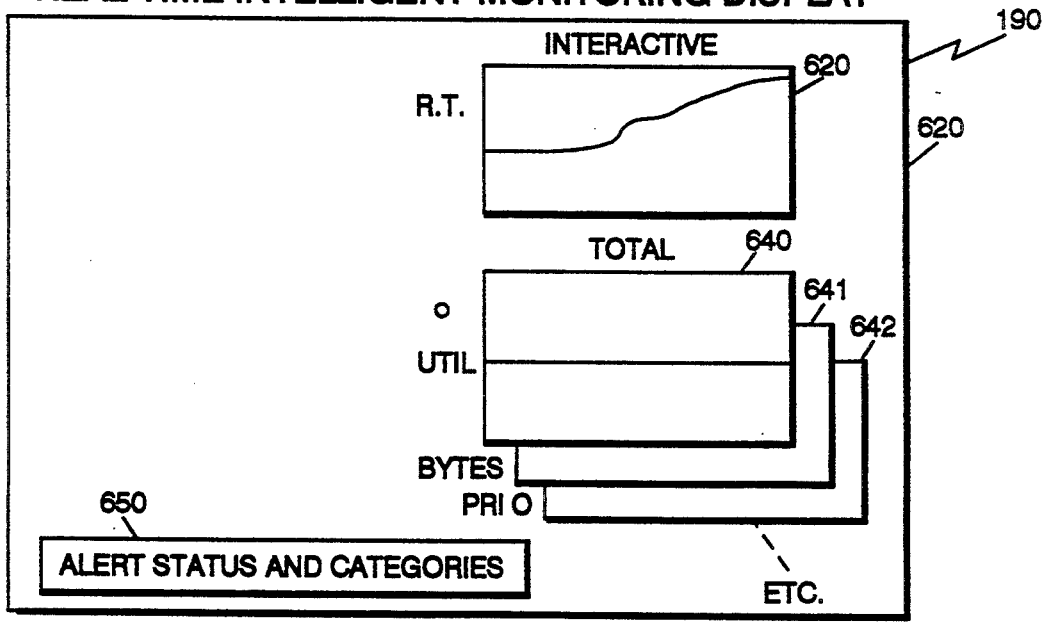

The same situation can occur for example as shown in FIG. 6C where traffic can be identified to meet criteria 2 shown in FIG. 3, which is 150'. This indicates that the presence of smaller sizes or infrequent activity representing interactive traffic, could be identified on the network, which could result in a display similar to FIG. 6C occurring. Again, expert system feedback to the benchmark manager facility that is building BDSs can update the interactive traffic benchmarking. FIG. 6C can show delay characteristics of traffic in a display shown as 620 in FIG. 6C, which will display the response time characteristics of the traffic over a series of intervals, specified by I5, given in FIG. 2. The interactive traffic can be monitored and compared to the benchmark data set information about interactive traffic, given in 120' in FIG. 3. If aspects of criteria 2 are exceeded or satisfied, then indicate a potential problem due to response time getting too high, for example. Also, this information can be passed in terms of an alert to the expert system. The expert system can notice that the batch traffic is still busy in the network at the same time that the interactive traffic has a response time problem, and can elect to send a control signal out of the network, to turn off batch traffic. When this occurs, this can take us to FIG. 6D, because once batch traffic disappears, criteria 1 given in FIG. 3, location 150, will no longer be satisfied and that display is no longer relevant for this time frame in this network.

Figure 6E:
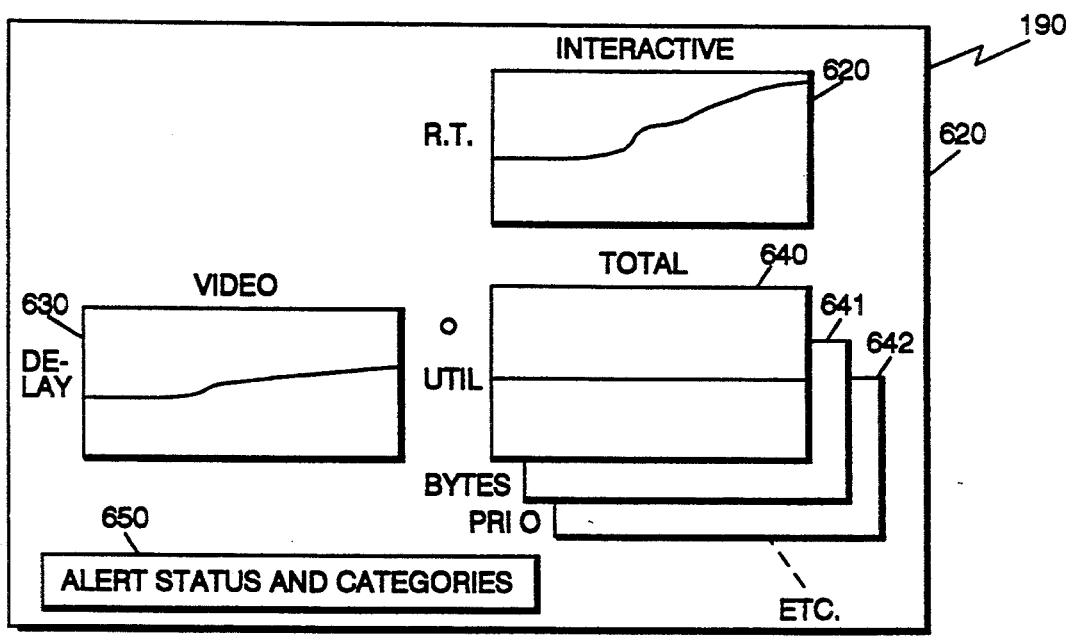

If other traffic should occur in the network, such as video traffic start, then it is quite possible that FIG. 3 criteria 3, which is 150" could indicate the presence of video traffic. This would then cause a signal to be sent, such that the monitoring activity shown, or given by the event vector 140, can be displayed with the characteristics of the delay of the video traffic. This is shown in FIG. 6E and the video display shown as location 630. This information can be displayed as long as video traffic is detected as being present in the network by the monitoring activity and continues to satisfied the rules in criteria 3, given by 150" in FIG. 3. For the video display information, if it varies significantly from the benchmark data set's historical activity 120" in FIG. 3, then the rules within criteria 3 can send alerts to the status panel of the display in FIG. 6E, location 650. This information in the display, along with the alert, can force the network to take control actions to deal with the unusual delay in video traffic. We can also log the information for the subsequent problem determination and analysis if it is not convenient to do it in realtime. The network can take actions to alleviate the delay problem by rerouting interactive traffic for example, or by adding additional capacity or bandwidth or by reprioritizing traffic in a network such that the video traffic gets preferential treatment in some way. If the traffic that is video, batch or interactive ceases and becomes sporadic traffic in a network for whatever reason, the displays could be brought down and we go back to FIG. 6A, which shows that the batch, interactive and video traffic are no longer present in the network. The network may in fact be used at this point by voice traffic, which does not satisfy any of the current active criteria. The expert system at this point, can notice that there is traffic in the network and the criteria that is active, does not consider voice traffic. It may elect to reorganize or activate criteria in table 410 in FIG. 4, which will allows us to determine the presence of other types of traffic and then be able to display or generate alerts based on what's happening in the network on the type, quantity, protocol, account, origin or destination, etc. of the traffic.

One of the features of the invention is the creation of benchmark data sets on the fly by the monitoring facility 100 and the benchmark manager 195 shown in FIGS. 1A and 1B. The monitoring facility will generate benchmark data set information in 110, during the interval time that it is monitoring. However, we do not want to replace information in our benchmark data set with erroneous information that represents non-optimal or defective operation of the media. If events are occurring in the EDI vectors, which indicate a potential problem on the media, then the benchmark manager will not utilize those I5 intervals effected or will not fill in the benchmark collection interval information I3 into the BDS that is being constructed into the next BDS in 110. This benchmark collection information will not be utilized in the next BDS. It would be left blank or data extrapolated from other intervals or data from previous BDSs used. When this BDS is put into use as the current benchmark data set 120, any blank information fields could be rolled forward from the prior BDS before the one that was put in use in 120. Therefore, we will accumulate information in the benchmark data sets that is non-erroneous and provides only activity about network behavior that can be used as a standard of normal network operation. For example, only that activity which has occurred when there is no alert present.

Figure 7:
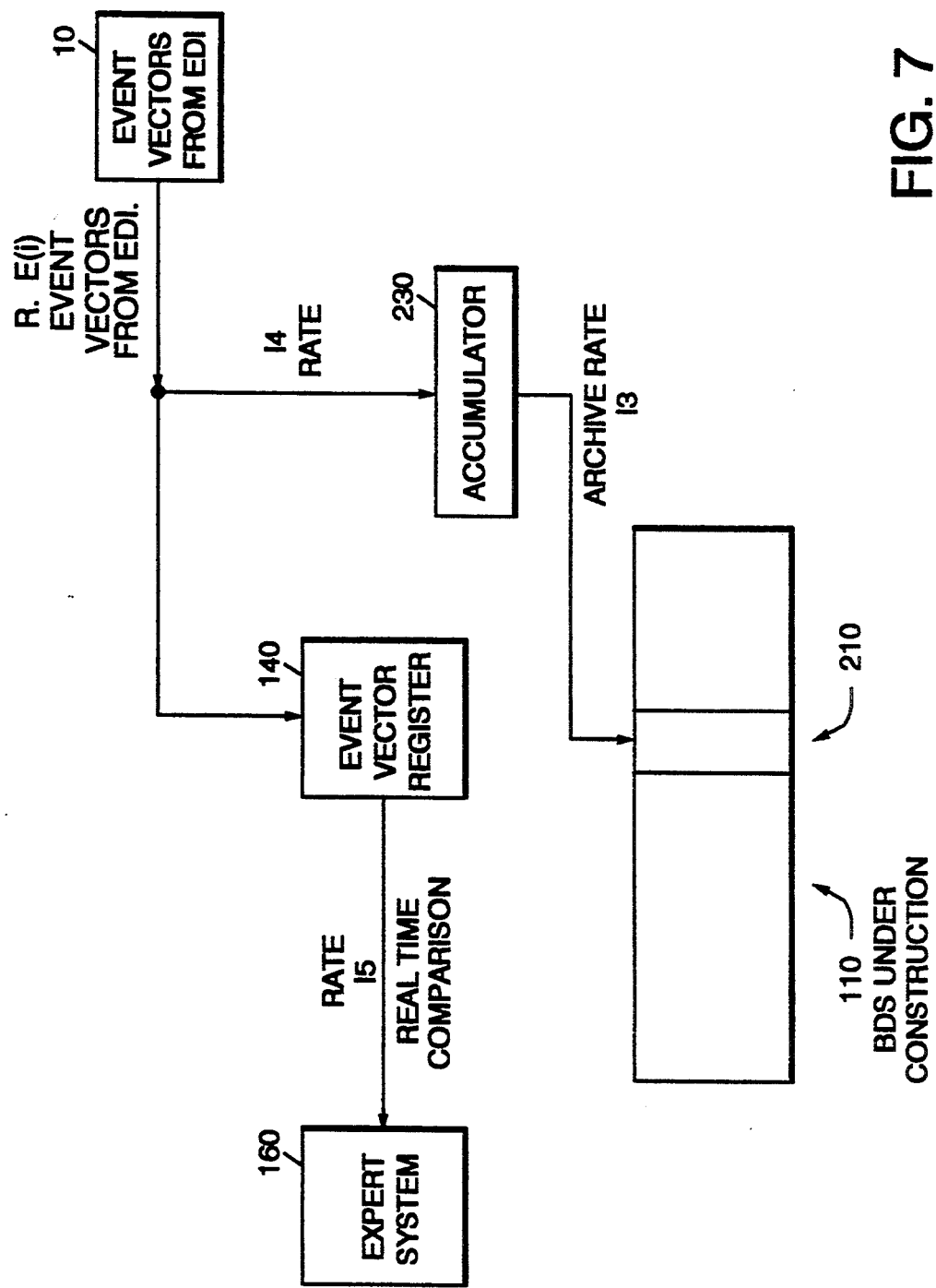
FIG. 7 is an illustration of the rates R, I3, I4, I5.

FIG. 7 is a schematic illustration showing the relationship of the data rates I3, I4 and I5. FIG. 7 shows the arrow from the Event Driven Interface 10 which delivers event vectors E(i) to both the event vector register 140 and to the accumulator 230. The event vectors are supplied from the EDI 10 at a particular rate, which is I5. The rate of application of event vectors or information derived from the event vectors in the register 140 is I5 and that is used for the realtime analysis by the expert system 160. The accumulator 230 is a second path connected to the source of event vectors 10. The accumulator 230 will accumulate event vectors for a time frame of I4, which can be as frequent as the rate I5. In particular, the rate I4 need not equal the rate I5. The accumulator 230 will accumulate information in the event vectors from the EDI 10 and at a rate I3 which is called the archive rate, information from the accumulator 230 will be loaded into the benchmark collection interval 210 for the current I3 time, for example for the current hour. If the duration of one hour corresponds to the benchmark collection interval 210, then the archive rate I3 is one hour. Thus FIG. 7 shows the relationship between the rate of supply of event vectors and I3, the rate of realtime comparison on event vector information to the expert system 160, which is I5, the rate of accumulation of event vector information in the accumulator 230, which is I4, and the archive rate I3, which is the rate at which information is loaded into the benchmark collection interval 210.

Figure 10B:
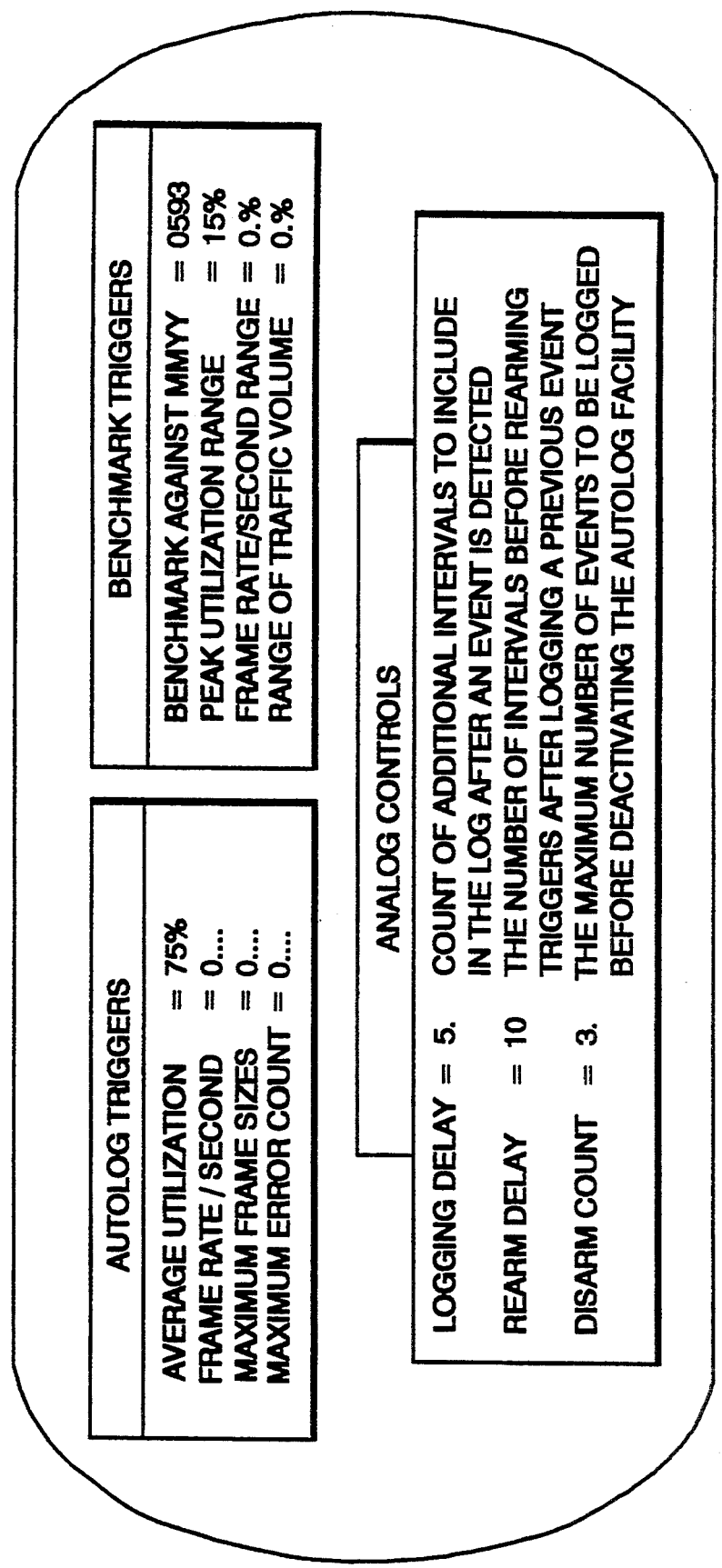
Figure 10C:
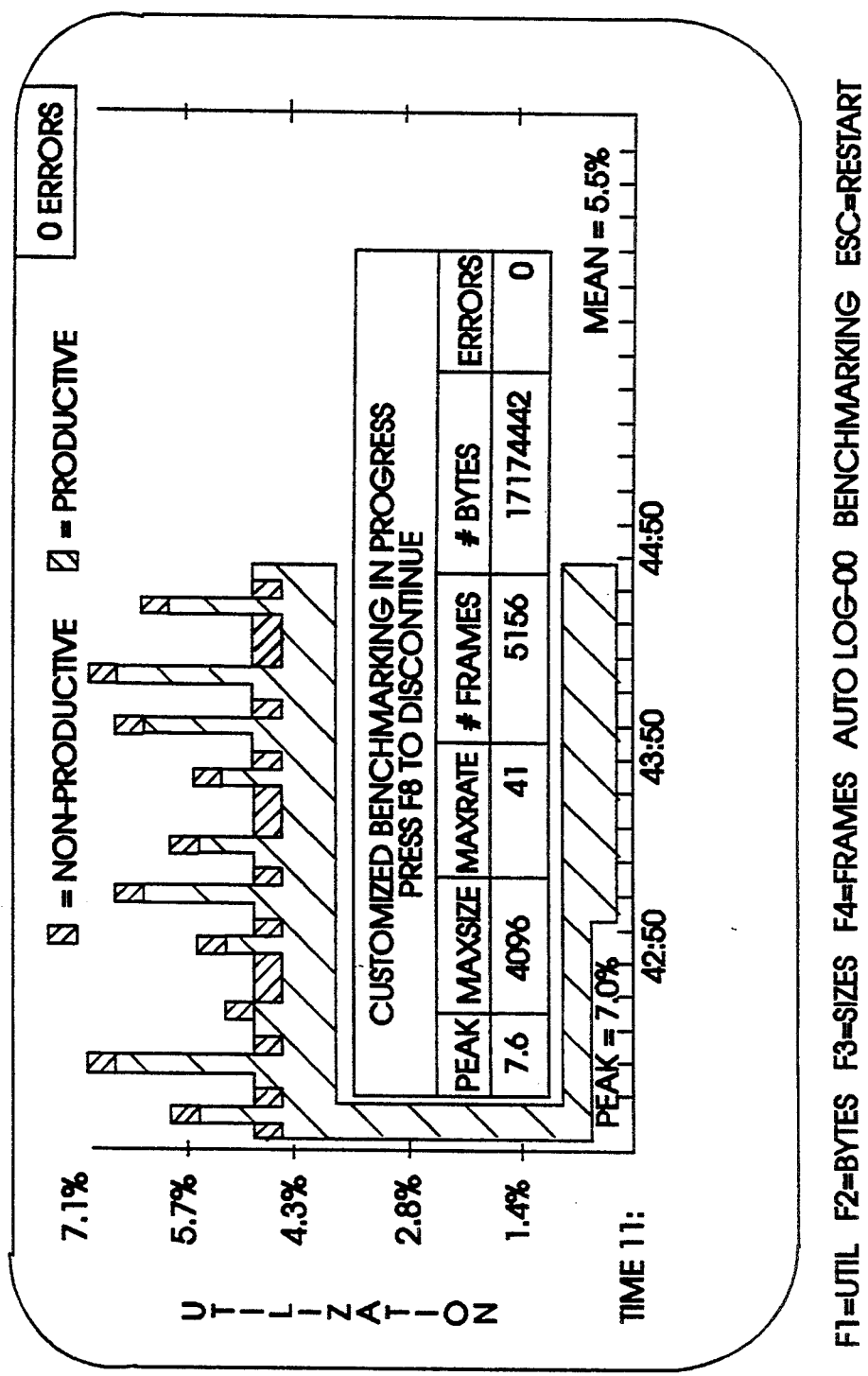
Figure 10D:
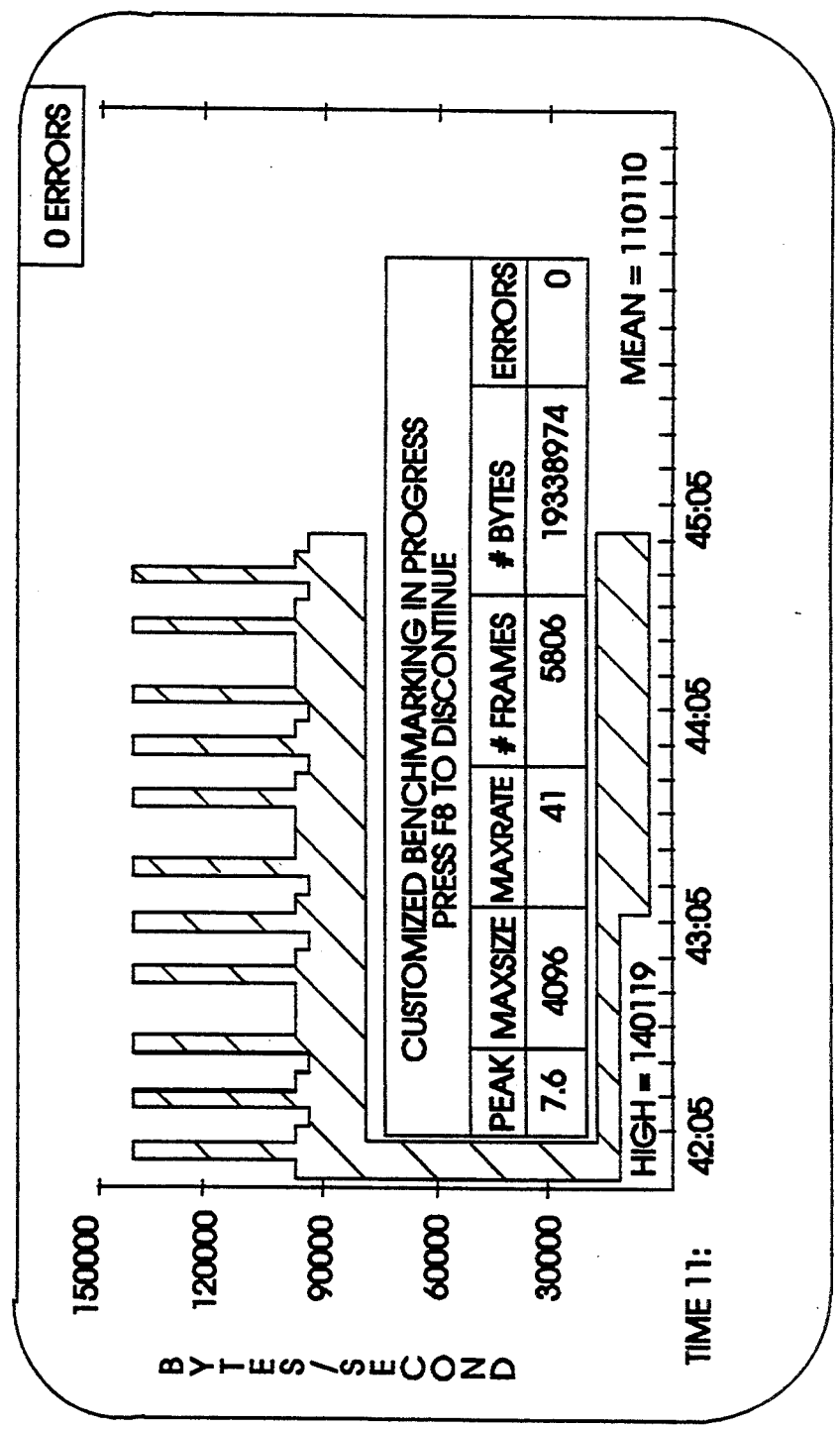
Figure 10E:
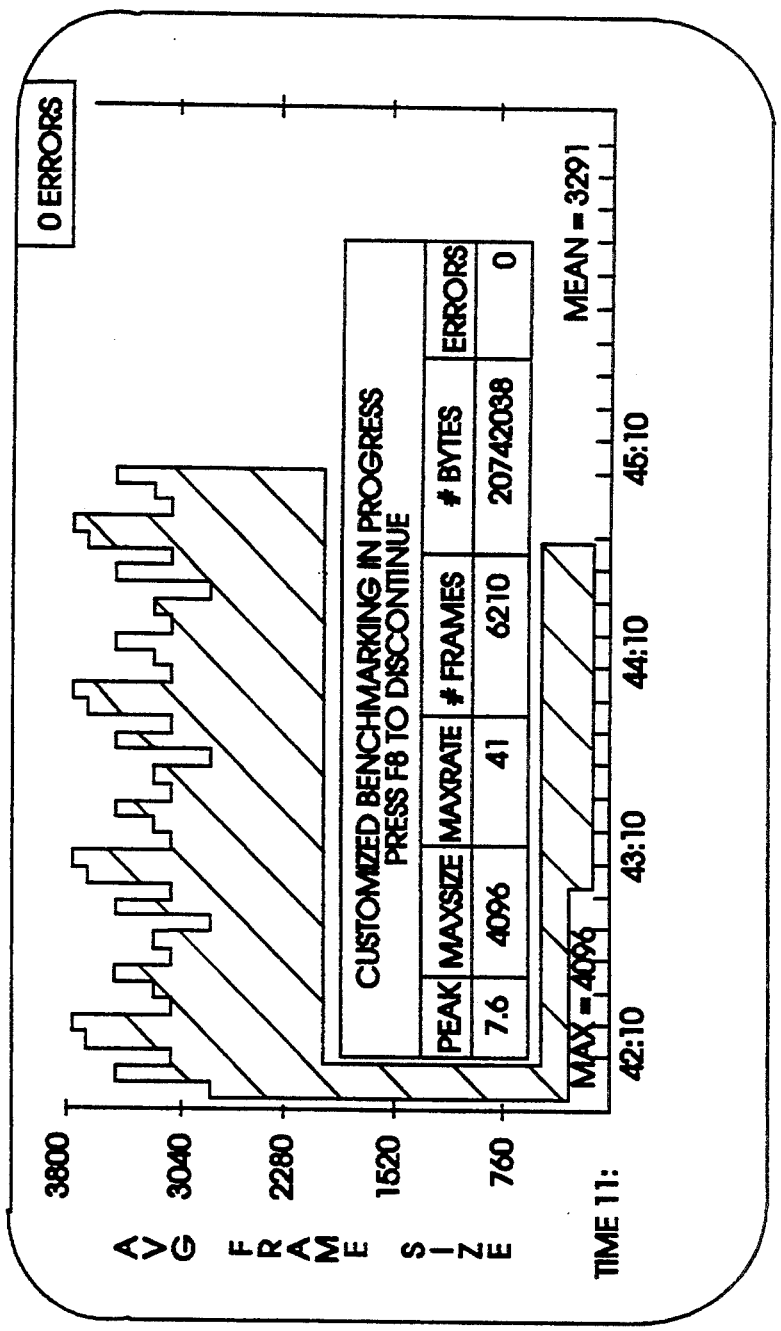

FIGS. 10A–10F show example display screens for the Intelligent Realtime Monitor 199 which characterize various display outputs to the user for the monitoring of a token ring network by the invention. FIG. 10A shows a display of monitor settings and token ring LAN information. FIG. 10B shows the display of auto log triggers, benchmark triggers and auto log controls. FIG. 10C shows the display of the utilization information and customized benchmarking which is in progress for monitoring a token ring network. FIG. 10D shows an example screen of the display of bytes per second and the customized benchmarking in progress for a token ring network being monitored by the invention. FIG. 10E shows the display of the average frame size and customized benchmarking in progress for the monitoring of a token ring network by the invention.

Figure 10F:
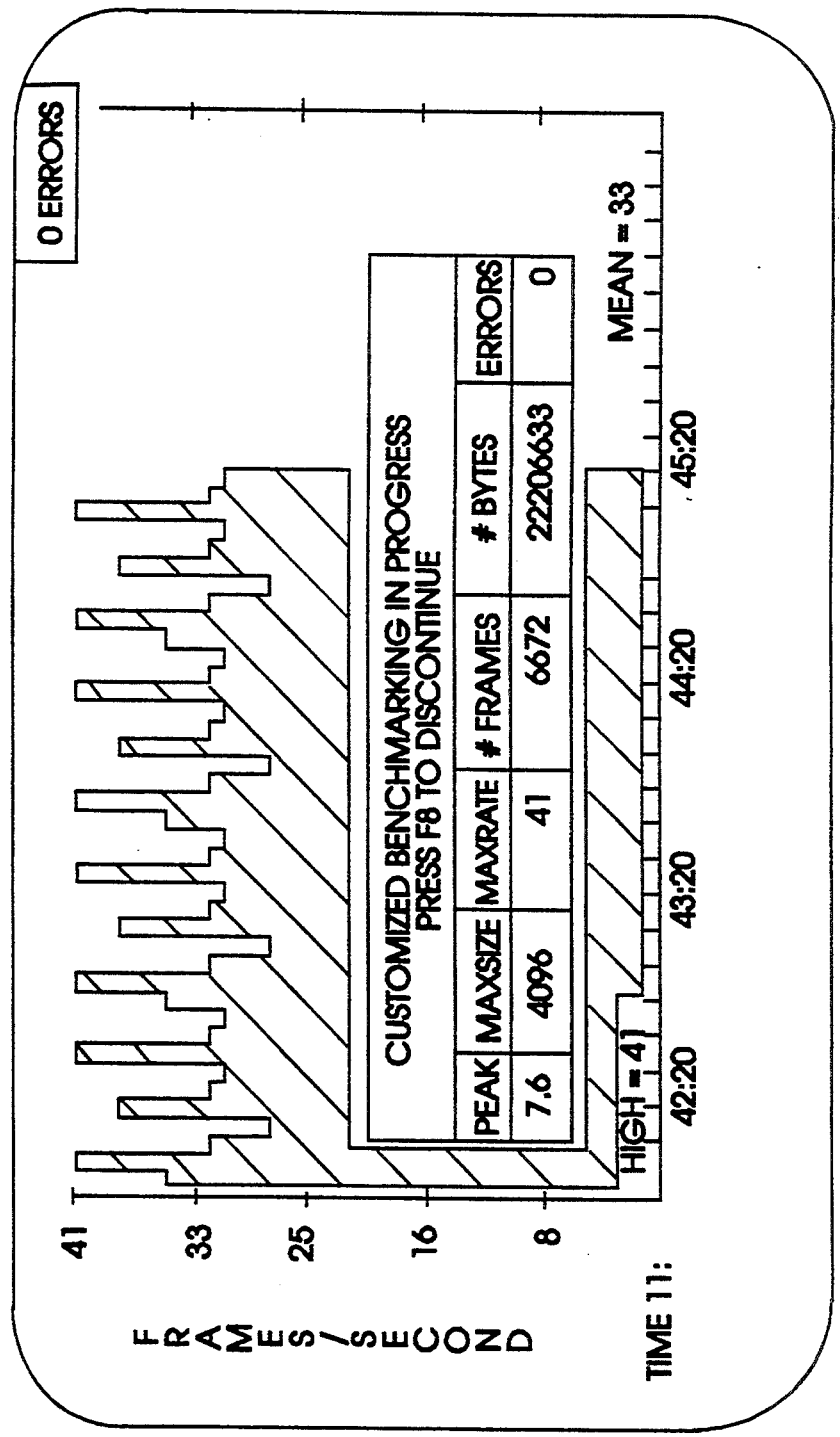

FIG. 10F shows the display of frames per second and the customized benchmarking in progress for a token ring network being monitored by the invention. In each of the screens shown in FIGS. 10C, 10D and 10F, the customized benchmarking in progress can be considered as characterizing the contents of the accumulator storage 230 in the customized benchmark manager 195 of FIG. 1A.

The rule based criteria module 150 will include rules which can identify the traffic class to which an event vector is a member on the network. The rule based criteria module 150 will generate display characterizations of the identified traffic class using the Intelligent Realtime Monitor 199. The rule based criteria module 150 will also allocate the event vector or information derived from the event vector to a particular one of a several benchmark data sets 110 according to the identified traffic class to which that event vector is classified. This concept of relating the display or archiving or the control of the network to different classes of traffic based on the rule based criteria modules, is a feature of the Intelligent Realtime Monitor and the expert system analysis module 160.

With regard to updating the benchmark data set used as the standard for the rule based criteria modules, it is the historical benchmark data set 120 which contains the full complement of accumulated data for a period such as the I2 period of one week, which serves as the standard for the rule-based decisions carried out by the expert system analysis module 160. In contrast, the benchmark data set 110 is the data set which is currently being accumulated as operations are being monitored on the network on a realtime basis.

This is an example of the prior concepts discussed in this patent application. In this example, we will refer to FIGS. 1A and 1B, also refer to Table 1, Table 2 and FIG. 11. In Table 1, we see a sample log from a token ring using an ICA component to collect data from an existing ring. The table shows a series of one minute event vectors that are captured from time frame 13:39 to time frame 14:38. It is one hour's worth of activity on an actual running token ring. There are 60 event vectors in this file. The first event vector arrives at time 13:39 and it's the first row of Table 1. It arrives from the ICA monitor 100 shown in FIG. 1A or FIG. 1B. The event vector shows the number of tokens, the number of frames, max, MAC activity, beacons, address recognizes frame copy activity, min frame size, max frame size and max and frames for rotation. This particular event vector allows us to identify traffic and activity at the token ring MAC layer. When the event vector comes in, then it is placed in buffer array 140. Buffer array 140 is accessed by the expert system analysis module 160.

Figure 11:
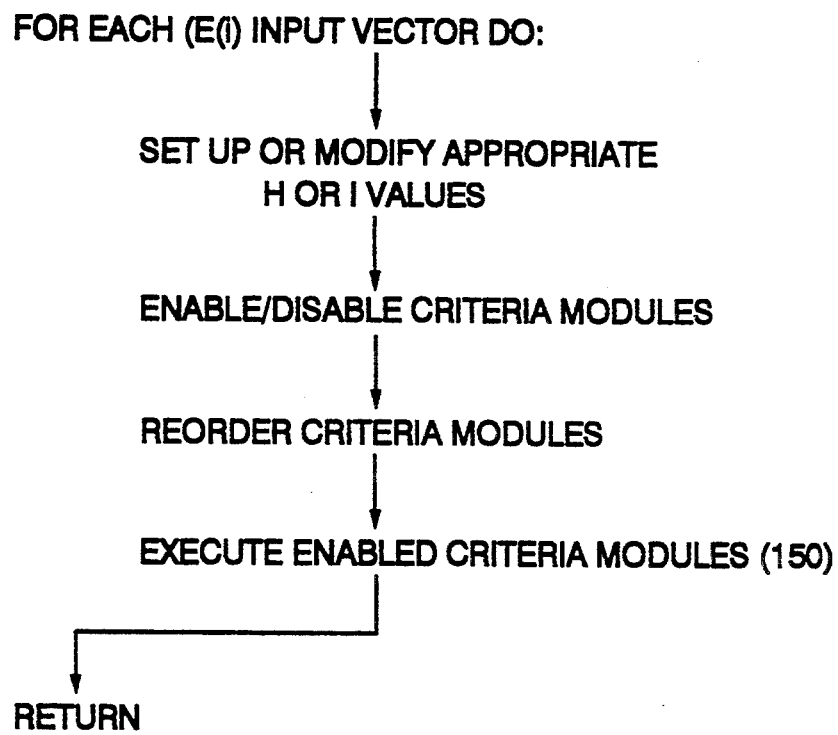
FIG. 11 shows a flow diagram of the expert system.

Looking at FIG. 11 shows the expert system flow for 160. For each event vector, we will set up and modify any appropriate parameters that have heuristics or timing values associated with them. For example, heuristics dealing with the sizes of traffic to be designated whether it is batch or interactive. Heuristics dealing with the rate at which traffic arrives to help us identify whether it is a voice or video component. The I values refer to the I values given in FIG. 1A which represents the example timings of when data is collected or when data is accumulated or stored or used in an historical fashion from the benchmark data sets. The I values are I1, I2, I3, I4 or I5. Referring back to FIG. 11, after we have modified any appropriate values. The expert system will enable or disable criteria modules based on its understanding of what the traffic represents from each event vector. If necessary, it will reorder the criteria modules so that it can handle realtime issues before it handles other issues that do not have timing sensitivity. For example, video delays are more critical and need to be handled immediately versus throughput requirements for batch traffic. Once we have reordered the criteria modules, we will execute any enable modules which will allow us to control the traffic, change priority, reroute selected traffic, modify tuning parameters, etc. The expert system is also sending signals to the customized benchmark manager so that it is better able to take the information from the traffic that has accumulated in the accumulated storage 230 and categorize information for historical use in the appropriate benchmark data sets, using the appropriate algorithms or heuristics. As each event vector arrives, rules will be triggered to set up or modify the appropriate h or I values. Some examples rules are given in Table 3. For example, rule 3 specifies if the number of frames per second is less than the number of devices on the ring multiplied by an heuristic component based on the number of devices, then we could consider the ring idle or not. For example, in Table 1, the event vector labeled 13:39 shows a lot of token activity, very little frame activity over a 60 second time frame. If we divide the number of frames by 60 seconds, we'll see we have a frame rate of about six frames per second or less. If this is true and there it is more than six devices on the ring, then we are very comfortable that this ring isn't doing anything productive. It is considered housekeeping operations on the token ring. In this particular case, we would declare the ring to be in an idle state. Rule 4 which says that if the ring is in idle state for some number of I5 time intervals, then we are going to disable criteria modules or reorganize criteria modules as required because there isn't anything really going on that is of any interest at this time frame. It's all housekeeping operation. We will continue in this fashion for each event vector. The second event vector is labeled A and it shows the same type of activity where we see two events in a row which we have idle ring activity.

When we have multiple event vectors in a row that have idle activity or the lack of a certain type of activity such as batch or interactive or video for example, then we can reorder the criteria modules by some default order, or by historical usage using the benchmark data sets, or reorder criteria modules in an order that represents the most recently seen activity being the criteria modules that we execute first, assuming that the jobs have some kind of realtime characteristics associated with them. When we reorder the criteria modules, we could consider a specific default order that could either be learned by the system or set up by someone using the system. For example, if you were a department store and this is the day before Christmas, then the default order can be if there is no activity on the ring, we are always going to consider credit transactions to be the highest priority. If that is true, then we will reorder the criteria modules to look for an scan for credit activity first before looking for other traffic such as interactive or batch throughput, etc. As you go down through Table 1, we can see a series of event vectors that show for example very small number of frames per unit of time, less than a thousand and the max frame size is less than 200 (show as 103). When we get to time 14:00, we notice that there is a difference between 14:00 and 14:01, because during the time between 14:00 and 14:01, a batch job has started. The indicators indicate a batch job has started as the frame count begins to increase and the max frame size becomes significantly larger than what was seen in the past. Also, when you have batch traffic, you tend to have more concurrent activity on the ring so the MFR field tends to increase. At time 14:03, we can see a representative batch event vector that is labeled B. When this event vector comes in, it proceeds through expert system flow. The expert system would adjust anything that needed to be adjusted in terms of heuristic or I values by using event vector values and historical benchmark data set information. It would ultimately find out that rule 3 would fail. Also, rule 4 would fail because we have no idle, and then a series of rules like rule 5 would be in place, saying that the ring is doing something and we better find out what it's doing. In this case, we are looking in rule 5, whether we have batch traffic, which says for each I5 interval, we check the max frame size to see if it's greater than the heuristic that deals with batch or information from the benchmark data sets, and we check to see if there is a significant number of frames per unit of time and if there's activity that indicates some concurrent processing taking place (the MFR field value). When this is satisfied, we can be clear that batch traffic is active and we can enable the batch criteria to now closely examine the batch traffic to look for impact of the batch traffic amongst other traffic as well as how well it is operating on its own. When this is done, we can provide this information either to the status display such as the one shown in FIG. 1D, or we can provide the information to the customized benchmark manager which is shown as block 195 and the customized benchmark manager can use this information to categorize at the accumulator storage shown as 230 within the customized benchmark manager.

FIG. 2 shows a blowup of the customized benchmark manager. We can see that in FIG. 2, there is an input into accumulated storage 230 for the output of the expert system which will identify which specific characteristics of the traffic that we're analyzing belong in batch, belong in interactive, belong in video, etc. With this information, the benchmark manager can put this information in the appropriate benchmark data set and therefore the data set becomes customized to the individual client's token ring environment. The expert system can use this information in the future to try to better understand the characteristics of the ring to see if it deviates in the future from past behavior that represents the standard of its performance.

As you take a look at event vector B in Table 1, we can see that the maximum number of frames is at 6,804 frames per minute and there are some large frame sizes that are over 1,000 bytes as the max frame size. Rule 2 could be executed as part of the batch criteria module which can be utilized to adjust what we consider to be batch traffic based on what we have seen in the past and what we are seeing now. Rule 2 says that if there is a lot of batch traffic on the ring, in other words, the ring itself is utilized very heavily, or the benchmark data set shows high utilization for the same time period in the past, and the frame sizes are greater than 200, then we can assign a value to what we consider to be the size that represents batch traffic by taking the max frame size and adjusting it with some heuristic shown as h(adj). The h(adj) heuristic would be a sensitivity factor, which is shown within rule 2 that says that if there is a benchmark data set that existed with some utilization in the past, or had some utilization in the past greater than 20%, we would adjust the sensitivity where we would consider batch traffic to be occurring, based on whether past benchmark data sets have identified batch activity. This will allows us to be more certain that when we categorize the traffic, that it is correctly categorized as batch traffic, and therefore the benchmark data set manager can accurately archive information into benchmark data sets based on what it's learned and ultimately converge to a standard of operation for a specific unique environment. As we go down to the additional vectors past the event vector B, we will ultimately come to the point at 14:11 and 14:12, these two event vectors which will show a decrease in the number of frames. It will also show the max frame size falling, and those intervals will again come back and execute through the expert system in FIG. 11 for each vector. We may or may not modify the h or I values. We will probably disable criteria modules and reorder criteria modules based on rules 3 and 4. Once we have done this, we will execute any enable criteria module for each interval and feed data to an intelligent display for realtime monitoring to understand current ring activity. The expert system will also feed its analysis back to the customized benchmark manager so that he can place the information in the appropriate benchmark data sets for use in the future.

We look at Table 1 at time frame 14:11, we notice that there's not much activity. We have an idle token ring, because rule 3 will continually fire during this time period, which will show that the ring is idle and eventually, when we get enough idle time frame in a row, rule 4 will start firing which will disable or reorder criteria modules based on the most recent activity the modules represent. Eventually, we will get to a point where spike activity could occur in the network and that is labeled line C in Table 1 which is at time 14:28. In line C, we see that there is a large max frame size. However, the number of frames is not as great as we have seen previously (looking at the event vector shown as B in the Table 1). In this particular case, the I5 value that is collecting data in Table 1 is a one minute interval. This I5 value could have batch traffic activity occurring within the one minute interval, but it is a batch job of very short duration. Because of this, rule 5 will not fire to enable batch criteria to occur because the number of frames isn't large enough. Rule 3 will no longer be valid, because the ring is not idle. Batch criteria appears to be occurring during some portion of this one minute I5 time frame. If this particular ring environment has batch jobs of short durations, then rules can be added to the analysis to identify the fact that short duration batch jobs are occurring and modify the I5 interval. Rule 7 shows an example of this. Rule 7 is the opposite of rule 5 where we look for the number of frame counts being low, but the max frame size satisfies a heuristic for what constitutes batch traffic. Also the MFR field is satisfied as well. If we find that the batch benchmark data set shows past utilization due to batch activity to be more than 10% of the ring activity, then we can instruct the ICA monitor 100 to adjust a time interval that event vectors are given to us from one minute down to, in this case, 30 seconds. Rule 7 shows I5 taking on the value of I5 divided by two. We can use division by two, division by three, some heuristics, some algorithms, some linear or nonlinear functions to modify the time interval based on what we're doing with the data and what we expect to see by shrinking I5 intervals down. In this particular case of batch traffic, if we shrink the intervals down, we can more easily identify batch jobs of short duration and what the expert system may find is that this particular environment does have batch jobs of short duration. This information can be fed from the expert system to the benchmark data set and the benchmark data set could indicate this activity in FIG. 2 by taking information accumulated storage (230 in FIG. 2), putting it within the batch benchmark data set at the appropriate time interval, in this case in a one your time interval, to indicate that during these time intervals, batch jobs of short duration occur. This can be used in the future to help us better understand the behavior of the ring media to determine whether the ring is operating normally or abnormally.

In addition, besides guiding the benchmark manager instructions about how to place information within the benchmark data sets, the same information can be sent out as network control signals to change the network characteristics such as the priority of short batch jobs, especially if it is detected that during the period of time when a short batch job was occurring, spikes in video delay or interactive traffic response time was occurring as well. If necessary, we could reroute batch traffic or change tuning parameters or allocate additional bandwidth or make modifications to the network environment to satisfy other traffic characteristics such as the delay required for video terminals. It is possible in this case, that batch jobs of short duration could cause video display flickering. In this case, we can detect the activity that short duration batch jobs are occurring and through a similar mechanism, detect that video display activity is being impacted by the presence of the batch job and either change the job characteristics or reroute the batch traffic so that video delays are not interfered with.

One thing to notice, after the interval is adjusted, in this case we adjust the interval I5 from one minute down to 30 seconds, using rule 7. If the batch traffic stops, for example the line after line C in Table 1, then we'll start triggering rule 3 and rule 4 again. Looking at rule 4, it doesn't make sense to monitor the facility for an extended period of time using short I5 values. Eventually I5 should be modified to some default setting, or raise the value depending on what we're doing in the system and what kind of problem we're solving. This can be done with other rules whenever there is a comparison of an event vector's data with benchmark data set data, such as in rule 7 for example, the operation is to receive the event vector which represents realtime operation of the network. The corresponding benchmark data set is examined. If the data in the event vector represents a greater maximum utilization than the data in the benchmark data set, then the rule is satisfied and the specified change is made. For example, if the event vector indicates batch activity having a maximum utilization 10% greater than the corresponding benchmark data set batch activity maximum utilization value, then rule 7 will divide the current value of I5 by the value of two to reduce the interval by one-half, to obtain a more accurate picture of batch traffic characteristics.

In summary, this invention allows event vectors to cause the modification of expert system operation, the timing at which expert system makes or collects data, the way data is archived, the way the expert system controls the network because individual traffic will have particular characteristics. As an example, you will be able to recognize batch traffic, due to the fact that large sizes, burst activity, and no or low priority usage are classic characteristics of batch traffic. Interactive traffic tends to have characteristics of smaller random sizes that are small and have infrequent activity. Voice traffic or video traffic usually comes up to have a particular large size, a constant regular frequency over a long time frame, and tends to use high priority. Using this characterization of traffic, then the event vectors can collect this information. This can cause activation or deactivation of criteria. Criteria can be customized based on the environment. This can reduce erroneous alerts or logs and allow us to modify or to manage the network environment to prevent radical traffic variances from occurring, which can have an impact on for example, multimedia environments.

In summary, by using information about the activity of the environment, in this particular example, a token ring, and historical information, the expert system can modify criteria, heuristics and time frame intervals. This invention will allow us to ultimately converge onto a standard of operation that allows an expert system (or other programs or users) to judge the behavior of the environment and whether or not the behavior differs from expected norms and whether the difference represents a problem and whether the problem is a significant problem or not.

Although a specific embodiment of the invention has been disclosed, it will be understood by those having skill in the art, that changes can be made to that specific embodiment without departing from the spirit and the scope of the invention.

TABLE 1

| | | Sample Log from Token Ring Intelligent Monitor | | | | | | | |
|---|---|---|---|---|---|---|---|---|---|
| Time | #Tokens | #Frames | #Mac | #B | ~AR | ~FC | MINF | MAXF | MFR |
| 13:39 | 5615318 | 674 | 128 | 0 | 284 | 284 | 22 | 103 | 1 |
| 13:40 | 5616870 | 622 | 144 | 0 | 281 | 281 | 22 | 103 | 1←A |
| 13:41 | 5610577 | 702 | 144 | 0 | 291 | 291 | 22 | 103 | 1 |
| 13:42 | 5616849 | 686 | 122 | 0 | 290 | 290 | 22 | 103 | 1 |
| 13:43 | 5616216 | 702 | 144 | 0 | 291 | 291 | 22 | 103 | 2 |
| 13:44 | 5613730 | 686 | 128 | 0 | 290 | 290 | 22 | 103 | 1 |
| 13:45 | 5616815 | 702 | 144 | 0 | 291 | 291 | 22 | 103 | 1 |
| 13:46 | 5616854 | 686 | 128 | 0 | 290 | 290 | 22 | 103 | 1 |
| 13:47 | 5615255 | 702 | 144 | 0 | 291 | 291 | 22 | 103 | 1 |
| 13:48 | 5613696 | 702 | 144 | 0 | 291 | 291 | 22 | 103 | 2 |
| 13:49 | 5616853 | 686 | 128 | 0 | 290 | 290 | 22 | 103 | 1 |
| 13:50 | 5619926 | 706 | 144 | 0 | 294 | 294 | 22 | 103 | 1 |
| 13:51 | 5613726 | 691 | 128 | 0 | 292 | 292 | 22 | 103 | 2 |
| 13:52 | 5613601 | 739 | 144 | 0 | 310 | 310 | 22 | 103 | 2 |
| 13:53 | 5613548 | 754 | 128 | 0 | 324 | 324 | 22 | 103 | 2 |
| 13:54 | 5618465 | 670 | 144 | 0 | 275 | 275 | 22 | 103 | 1 |
| 13:55 | 5610568 | 706 | 144 | 0 | 293 | 293 | 22 | 103 | 1 |
| 13:56 | 5612185 | 682 | 128 | 0 | 288 | 288 | 22 | 103 | 1 |
| 13:57 | 5624613 | 702 | 144 | 0 | 291 | 291 | 22 | 103 | 1 |
| 13:58 | 5616848 | 686 | 128 | 0 | 290 | 290 | 22 | 103 | 1 |
| 13:59 | 5607545 | 670 | 144 | 0 | 275 | 275 | 22 | 103 | 2 |
| 14:00 | 5621449 | 942 | 142 | 0 | 411 | 411 | 22 | 2056 | 1 |
| 14:01 | 5583260 | 2218 | 130 | 0 | 1055 | 1055 | 22 | 2056 | 3 |
| 14:02 | 5595706 | 4468 | 144 | 0 | 2174 | 2174 | 22 | 2056 | 2 |
| 14:03 | 5592697 | 6804 | 128 | 0 | 3349 | 3349 | 22 | 1065 | 2←B |
| 14:04 | 5594978 | 5468 | 144 | 0 | 2674 | 2674 | 22 | 1065 | 2 |
| 14:05 | 5598399 | 3096 | 128 | 0 | 1495 | 1495 | 22 | 1734 | 2 |
| 14:06 | 5599035 | 4348 | 144 | 0 | 2114 | 2114 | 22 | 1065 | 2 |
| 14:07 | 5600540 | 3158 | 144 | 0 | 1519 | 1519 | 22 | 1065 | 2 |
| 14:08 | 5604774 | 4748 | 128 | 0 | 2321 | 2321 | 22 | 1065 | 2 |
| 14:09 | 5606547 | 1196 | 144 | 0 | 538 | 538 | 22 | 1065 | 1 |
| 14:10 | 5599831 | 1176 | 128 | 0 | 535 | 535 | 22 | 2056 | 2 |
| 14:11 | 5621271 | 776 | 144 | 0 | 328 | 328 | 22 | 220 | 2 |
| 14:12 | 5610609 | 684 | 128 | 0 | 289 | 289 | 22 | 141 | 1 |
| 14:13 | 5615186 | 724 | 144 | 0 | 302 | 302 | 22 | 141 | 1 |
| 14:14 | 5617685 | 953 | 144 | 0 | 416 | 416 | 21 | 220 | 2 |
| 14:15 | 5612116 | 706 | 128 | 0 | 300 | 300 | 22 | 103 | 2 |
| 14:16 | 5616815 | 702 | 144 | 0 | 291 | 291 | 22 | 103 | 1 |
| 14:17 | 5615273 | 692 | 128 | 0 | 293 | 293 | 22 | 103 | 1 |
| 14:18 | 5612152 | 696 | 144 | 0 | 288 | 288 | 22 | 103 | 2 |
| 14:19 | 5620029 | 666 | 128 | 0 | 280 | 280 | 22 | 103 | 1 |
| 14:20 | 5616728 | 734 | 144 | 0 | 307 | 307 | 22 | 103 | 2 |

TABLE 1-continued
Sample Log from Token Ring Intelligent Monitor

| Time | #Tokens | #Frames | #Mac | #B | ~AR | ~FC | MINF | MAXF | MFR |
|---|---|---|---|---|---|---|---|---|---|
| 14:21 | 5609065 | 686 | 144 | 0 | 283 | 283 | 22 | 103 | 1 |
| 14:22 | 5616892 | 670 | 128 | 0 | 282 | 282 | 22 | 103 | 1 |
| 14:23 | 5618320 | 722 | 144 | 0 | 301 | 301 | 22 | 103 | 1 |
| 14:24 | 5615260 | 698 | 128 | 0 | 296 | 296 | 22 | 103 | 1 |
| 14:25 | 5613783 | 670 | 144 | 0 | 275 | 275 | 22 | 103 | 1 |
| 14:26 | 5613730 | 686 | 128 | 0 | 290 | 290 | 22 | 103 | 1 |
| 14:27 | 5621524 | 690 | 144 | 0 | 285 | 285 | 22 | 103 | 1 |
| 14:28 | 5612109 | 876 | 144 | 0 | 378 | 37B | 22 | 2056 | 2←C |
| 14:29 | 5615148 | 738 | 128 | 0 | 316 | 316 | 22 | 103 | 1 |
| 14:30 | 5615196 | 722 | 144 | 0 | 301 | 301 | 22 | 103 | 1 |
| 14:31 | 5611763 | 924 | 128 | 0 | 359 | 359 | 22 | 565 | 1 |
| 14:32 | 5613500 | 774 | 144 | 0 | 327 | 327 | 22 | 103 | 1 |
| 14:33 | 5613555 | 750 | 128 | 0 | 322 | 322 | 22 | 103 | 2 |
| 14:34 | 5621291 | 776 | 144 | 0 | 328 | 328 | 22 | 103 | 2 |
| 14:35 | 5612077 | 722 | 144 | 0 | 301 | 301 | 22 | 103 | 1 |
| 14:36 | 5619737 | 770 | 128 | 0 | 332 | 332 | 22 | 103 | 1 |
| 14:37 | 5612021 | 742 | 144 | 0 | 311 | 311 | 22 | 103 | 1 |
| 14:38 | 5613601 | 739 | 144 | 0 | 310 | 310 | 22 | 103 | 2 |

TABLE 2
SAMPLE BENCHMARK DATA SET (110) CREATED USING A ONE MONTH REFRESH CYCLE
$I_1$ = 1 MONTH
$I_2$ = 1 WEEK
$I_3$ = 1 HOUR
$I_4$ = 1 MINUTE
MAY BenchMark Table
ICA Interval = 00:01:00  Last Updated = 05/21/93

| Day | Hr | PkUtil | MaxSize | MaxRate | # Frames | # Bytes | Errors | Recorded |
|---|---|---|---|---|---|---|---|---|
| SUN | 00 | 3.4 | 2056 | 123 | 69452 | 9973441 | | 05/16/93 |
| | 01 | 4.6 | 2056 | 159 | 73487 | 10437977 | | 05/02/93 |
| | 02 | 4.1 | 2056 | 148 | 74546 | 30680097 | | 05/16/93 |
| | 03 | 7.0 | 2056 | 164 | 73661 | 10774450 | | 05/02/93 |
| | 04 | 5.1 | 2056 | 123 | 69446 | 34192226 | | 05/16/93 |
| | 05 | 4.1 | 2056 | 163 | 73428 | 10662887 | | 05/16/93 |
| | 06 | 4.3 | 2056 | 162 | 73847 | 10633279 | | 05/02/93 |
| | 07 | 4.5 | 2056 | 156 | 73092 | 11151949 | | 05/02/93 |
| | 08 | 4.3 | 2056 | 156 | 73869 | 22805021 | | 05/02/93 |
| | 09 | 3.3 | 2056 | 163 | 73288 | 10980206 | | 05/02/93 |
| | 10 | 3.3 | 2056 | 134 | 68514 | 11189363 | | 05/16/93 |
| | 11 | 3.8 | 2056 | 164 | 73532 | 30087408 | | 05/16/93 |
| SUN | 12 | 4.4 | 2056 | 160 | 73383 | 11377174 | | 05/16/93 |
| | 13 | 4.5 | 2056 | 158 | 73449 | 11245820 | | 05/02/93 |
| | 14 | 4.2 | 2056 | 153 | 73359 | 11563837 | | 05/02/93 |
| | 15 | 3.7 | 2056 | 163 | 73487 | 31208189 | | 05/16/93 |
| | 16 | 3.4 | 2056 | 133 | 69334 | 25924988 | | 05/16/93 |
| | 17 | 4.0 | 2056 | 162 | 73541 | 29835325 | | 05/16/93 |
| | 18 | 4.6 | 2056 | 159 | 73495 | 10664949 | | 05/02/93 |
| | 19 | 4.2 | 2056 | 152 | 73440 | 14035768 | | 05/16/93 |
| | 20 | 3.7 | 2056 | 163 | 73697 | 11339880 | | 05/02/93 |
| | 21 | 3.4 | 2056 | 118 | 68928 | 11382077 | | 05/16/93 |
| | 22 | 3.5 | 2056 | 163 | 76440 | 12683955 | | 05/02/93 |
| | 23 | 4.2 | 2056 | 162 | 73593 | 31970738 | | 05/16/93 |
| MON | 00 | 3.5 | 2056 | 135 | 69152 | 32606460 | | 05/17/93 |
| | 01 | 3.7 | 2056 | 162 | 69112 | 10746734 | | 05/17/93 |
| | 02 | 3.3 | 2056 | 125 | 68595 | 11391665 | | 05/17/93 |
| | 03 | 2.6 | 2056 | 154 | 68798 | 11109052 | | 05/17/93 |
| | 04 | 4.3 | 2056 | 123 | 69410 | 29057297 | | 05/17/93 |
| | 05 | 3.8 | 2056 | 113 | 69602 | 10449216 | | 05/17/93 |
| | 06 | 3.6 | 2056 | 141 | 69444 | 9781766 | | 05/17/93 |
| | 07 | 3.4 | 2056 | 132 | 69386 | 10358873 | | 05/17/93 |
| SAT | 12 | 4.5 | 2056 | 160 | 75883 | 30226763 | | 05/15/93 |
| | 13 | 8.2 | 2056 | 157 | 77629 | 31719750 | | 05/15/93 |
| | 14 | 7.1 | 2056 | 151 | 81539 | 28385725 | | 05/15/93 |
| | 15 | 3.3 | 2056 | 163 | 75639 | 20197813 | | 05/01/93 |
| | 16 | 3.7 | 2056 | 130 | 69066 | 32021444 | | 05/15/93 |
| | 17 | 4.2 | 2056 | 161 | 73431 | 32952163 | | 05/15/93 |
| | 18 | 4.6 | 2056 | 160 | 73531 | 10882011 | | 05/01/93 |
| | 19 | 4.3 | 2056 | 155 | 73449 | 30538826 | | 05/15/93 |
| | 20 | 3.6 | 2056 | 164 | 73290 | 31645461 | | 05/15/93 |
| | 21 | 3.5 | 2056 | 143 | 69494 | 29632549 | | 05/15/93 |
| | 22 | 3.8 | 2056 | 163 | 73726 | 11162162 | | 05/01/93 |
| | 23 | 4.5 | 2056 | 160 | 73544 | 27025417 | | 05/15/93 |

TABLE 3

EXAMPLE RULES FOR ADAPTIVE CRITERIA
SELECTION AND HEURISTIC MODIFICATION
(TOKEN RING EXAMPLE)

Rule 0: Using # tokens calculate ring latency for I5 time period.
Rule 1: If ring latency changes from one I5 interval to the next, then $$h(dev) = \frac{\text{Ring Bit Latency} - 64}{4}$$

(The h(dev) heuristic is set by ring latency changes calculated from changes in # tokens and # frames that indicate stations attaching to or leaving the ring.)

Rule 2: If max util > 50% or > BMDS MAX util and
MAXF > 200 then h(batch) = MAXFs − h(adj)
If BMDS (batch) MAX util = 0 then h(adj) = 1%
If BMDS (batch) MAX util > 20% then h(adj) = 10%

Rule 3: If #F/(sec's in interval) < # dev on ring * h(dev) then idle ring.

Rule 4: If idle ring for N is time frames then disable all traffic type criteria modules such as batch, int, video,...etc., else reorder criteria modules by default order and reset I5 to default setting.

Rule 5: If (in an I5 interval)
MAXFs > h(batch) and #F > h(dev) * 2 * (see in I5) and $$\left( MFR < \frac{h(dev)}{3} \text{ or } MFR < 2 \right)$$

then enable batch criteria.

Rule 6: If (in an I5 interval)
MAXFs < h(batch) and #F < h(dev) * (sec in I5) then disable batch criteria.

Rule 7: If (in an I5 interval)
MAXFs > h(batch) and #F ≤ h(dev) * 2 * (sec in I5) and $$\left( MFR < \frac{h(dev)}{3} \text{ or } MFR < 2 \right) \text{ and BMDS (batch)}$$

BMDS (batch) max util > 10% then I5 = I5/2.

What is claimed is:

1. In a system for analyzing, managing and controlling the output of a data communications network which communicates using a stream of data having characteristic patterns, a method for outputting control signals which are customized by classes of traffic on the network, comprising:
   storing a first criteria of rules in an expert system in said system to compare information derived from an event vector for a first class of traffic in said network with a standard for said first class of traffic in said network; said event vector comprising multiple statistical patterns of traffic classes;
   storing in a benchmark manager in said system a first benchmark data set as said standard for said first class of traffic, said first benchmark data set being derived from previously monitored events of said first class of traffic in said network;
   inputting to said system an event vector from an Event Driven Interface coupled to a data communications network, in response to an event of said first class of traffic in said network;
   accessing said first criteria of rules and comparing information derived from said event vector with said standard, using said first criteria of rules;
   outputting from said expert system in in said system, an inference signal in response to said comparison, which characterizes said event;
   archiving information derived from said event vector in a second benchmark data set in said system, for subsequent use as said standard;
   outputting control signals from a monitor to said network in response to said inference signal to manage and control said first class of traffic.

2. The method of claim 1 which further comprises:
   accessing a second criteria of rules to compare information from an event vector for a second class of traffic in said network with a standard for a second class of traffic in said network, in response to said inference signal.

3. The method of claim 1 which further comprises the step of:
   displaying a representation of said event classified as said first class of traffic.

4. The method of claim 1 wherein said archiving is in a selected location in response to said inference signal.

5. The method of claim 1 wherein said event vector is prepared over a period whose duration is selected in response to said inference signal.

6. The method of claim 1 which further comprises:
   substituting said second benchmark data set for said first benchmark data set as said standard to be used by said first criteria of rules, after a predetermined period of time.

7. The method of claim 6 wherein said predetermined period of time can be modified, as determined by a second criteria of rules in said system.

8. In a system for automated benchmarking using an Event Driven Interface for analyzing, managing and controlling the output of a data communications network which communicates using a stream of data containing different classes of traffic on the network, each class having characteristic patterns, a method for outputting control signals which are customized by classes of traffic on the network, comprising:
   storing a first criteria of rules in an expert system in said system to compare information derived from an event vector for a first class of traffic in said network with a standard for said first class of traffic in said network; said event vector comprising multiple statistical patterns of traffic classes;
   storing in a benchmark manager in said system a first benchmark data set as said standard for said first class of traffic, said first benchmark data set being derived from previously monitored events of said first class of traffic in said network;
   inputting to said system an event vector from an Event Driven Interface coupled to a data communications network, in response to an event of said first class of traffic in said network;
   accessing said first criteria of rules in said expert system and comparing information derived from said event vector with said standard, using said first criteria of rules;
   outputting from the expert system in said system, an inference signal in response to said comparison, which characterizes said event;
   displaying in a monitor in said system a representation of said event classified as said first class of traffic;
   archiving information derived from said event vector in a second benchmark data set in the benchmark manager in said system, for subsequent use as said standard; and
   outputting control signals from the monitor to said network in response to the inference signal to manage and control said first class of traffic.

9. The method of claim 8 which further comprises:
   accessing a second criteria of rules to compare information from an event vector for a second class of traffic in said network with a standard for a second class of traffic in said network, in response to said inference signal.

10. The method of claim 8 which further comprises the step of:
said display step including logging information derived from said event vector.

11. The method of claim 8 wherein said first class of traffic is batch traffic.

12. The method of claim 8 wherein said first class of traffic is video traffic.

13. The method of claim 8 which further comprises:
substituting said second benchmark data set for said first benchmark data set as said standard to be used by said first criteria of rules, after a predetermined period of time.

14. The method of claim 13 wherein said predetermined period of time can be modified, as determined by a second rule in said system.

15. A system for automated benchmarking with self customization using an Event Driven Interface for analyzing, managing and controlling the output of a data communications network which communicates using a stream of data containing different classes of traffic on the network, each class having characteristic patterns, comprising:
an event vector register coupled to the Event Driven Interface, for receiving event vectors characterizing the behavior of the data communications network; each event vector descriptive of a class of traffic occurring in the network;
an accumulator means coupled to said event vector register, for accumulating information from said event vectors;
a benchmark data set construction register coupled to said accumulator, for storing information accumulated in said accumulator from said event vectors characterizing said data communications network for a current interval;
an expert system, having an input coupled to said even vector register, for receiving information from said event vectors, said expert system having associated therewith one or more criteria modules which include rules for analyzing said behavior of said data communications network as evidenced by said event vectors relative to historical traffic patterns and pre-determined standards for each criteria module;
a benchmark data set comparison register coupled to another input to said expert system, for storing previous benchmark data sets characterizing said data communications network at a prior instant to said current interval;
said expert system performing an analysis of said data communications network behavior during said current interval using said benchmark data set comparison register and said information input from said event vector register;
said expert system updating said benchmark data set comparison register with the contents of said benchmark data construction register; and
means responsive to the expert system for modifying criteria modules in analyzing the network or initiating network control signals or logging traffic patterns or displaying traffic patterns or initiating an alert generator
whereby said data communications network is analyzed, managed and controlled for its behavior in comparison with dynamically updated benchmark information.

16. A system for controlling a data communications network using an Event Driven Interface for analyzing the output of a data communications network which communicates using a stream of data containing different classes of traffic on the network, each class having characteristic patterns, comprising:
an event vector register coupled to the Event Driven Interface, for receiving event vectors characterizing the behavior of the data communications network; each event vector descriptive of a class of traffic occurring on the network;
an accumulator means coupled to said event vector register, for accumulating information from said event vectors;
a benchmark data set construction register coupled to said accumulator, for storing information accumulated in said accumulator from said event vectors characterizing said data communications network for a current interval;
an expert system, having an input coupled to said event vector register, for receiving information from said event vectors, said expert system having associated therewith one or more criteria modules which include rules for analyzing said behavior of said data communications network as evidenced by said event vectors, each criteria module applicable to a different class of traffic;
a benchmark data set comparison register coupled to another input to said expert system, for storing previous benchmark data sets characterizing said data communications network at a prior instant to said current interval;
said expert system performing an analysis of said data communications network behavior during said current interval using said benchmark data set comparison register and said information input from said event vector register;
said expert system updating said benchmark data set comparison register with the contents of said benchmark data construction register; and
said expert system outputting control signals to said network through monitor means in response to said analysis.

17. In a system for analyzing the output of a data communications network which communicates using a stream of data containing different classes of traffic on the network, each class having characteristic patterns, a method for outputting control signals which are customized by classes of traffic on the network, comprising:
storing a first criteria of rules in said system to compare information derived from an event vector for a first class of traffic in said network with a first standard for said first class of traffic in said network; each event vector descriptive of a class of traffic occuring in the network, the combination of vectors definitive of all classes of traffic on the network;
storing a second criteria of rules in said system to compare information derived from an event vector for a second class of traffic in said network with a second standard for said second class of traffic in said network;
storing in said system a first benchmark data set as said first standard for said first class of traffic, said first benchmark data set being derived from previously monitored events of said first class of traffic in said network;

storing in said system a second benchmark data set as said second standard for said second class of traffic, said second benchmark data set being derived from previously monitored events of said second class of traffic in said network;

inputting to said system an event vector from an Event Driven Interface coupled to a data communications network, in response to an event of a class of traffic in said network;

accessing said first criteria of rules and comparing information derived from said event vector with said first standard, using said first criteria of rules, for said first class of traffic;

outputting in said system, a plurality of inference signals in response to said comparison, which characterizes said event;

accessing said second criteria of rules and comparing information from said event vector with said second standard, in response to a first inference signal, for said second class of traffic;

archiving information derived from said event vector corresponding to said second benchmark data set in said system, for subsequent use as said second standard; and managing and controlling the network using the remaining inference signals.

18. In a system for analyzing the output of a data communications network which communicates using a stream of data containing different classes of traffic on the network, each class having characteristic patterns, a method for outputting control signals which are customized by classes of traffic on the network, comprising:

storing a first criteria of rules in said system to compare information derived from an event vector for a first class of traffic in said network with a first standard for said first class of traffic in said network;

storing a second criteria of rules in said system to compare information derived from an event vector for a second class of traffic in said network with a second standard for said second class of traffic in said network;

storing in said system a first benchmark data set as said first standard for said first class of traffic, said first benchmark data set being derived from previously monitored events of said first class of traffic in said network;

storing in said system a second benchmark data set as said second standard for said second class of traffic, said second benchmark data set being derived from previously monitored events of said second class of traffic in said network;

inputting to said system an event vector from an Event Driven Interface coupled to a data communications network, in response to an event of a class of traffic in said network;

accessing said first criteria of rules and comparing information derived from said event vector with said first standard, using said first criteria of rules, for said first class of traffic;

outputting in said system, a first inference signal in response to said comparison, which characterizes said event;

accessing said second criteria of rules and comparing information from said event vector with said second standard in lieu of said first criteria of rules to customize analysis of the network, in response to said first inference signal, for said second class of traffic; and outputting control signals to said network to control said second class of traffic.

19. In a system for analyzing the output of a data communications network which communicates using a stream of data containing different classes of traffic on the network, each class having characteristic patterns, a method for outputting control signals which are customized by classes of traffic on the network, comprising:

storing a first criteria of rules in said system to compare information derived from an event vector for a first class of traffic in said network with a standard for said first class of traffic in said network; each event vector descriptive of a class of traffic occuring in the network, the combination of vectors definitive of all classes of traffic on the network;

storing in said system a first benchmark data set as said standard for said first class of traffic, said first benchmark data set being derived from previously monitored events of said first class of traffic in said network;

inputting to said system an event vector from an Event Driven Interface coupled to a data communications network, in response to an event of said first class of traffic in said network;

accessing said first criteria of rules and comparing information derived from said event vector with said standard, using said first criteria of rules;

outputting in said system, an inference signal in response to said comparison, which characterizes said event;

accessing a second criteria of rules to compare information from an event vector for a second class of traffic in said network with a standard for a second class of traffic in said network, in response to said inference signal; and outputting control signals to said network to control said first class of traffic and providing modifying signals to customize the first and second criteria of rules according to the traffic patterns.

20. In a system for analyzing the output of a data communications network which communicates using a stream of data containing different classes of traffic on the network, each class having characteristic patterns, a method for outputting control signals which are customized by classes of traffic on the network, comprising:

storing a first criteria of rules in an expert system in said system to compare information derived from an event vector for a first class of traffic in said network with a standard for said first class of traffic in said network;

storing in a benchmark manager in said system a first benchmark data set as said standard for said first class of traffic, said first benchmark data set being derived from previously monitored events of said first class of traffic in said network;

inputting to said system an event vector from an Event Driven Interface coupled to a data communications network, in response to an event of said first class of traffic in said network; each event vector descriptive of a class of traffic occuring in the network, the combination of vectors definitive of all classes of traffic on the network;

accessing said first criteria of rules and comparing information derived from said event vector with said standard, using said first criteria of rules;

outputting in said system from said expert system, an inference signal in response to said comparison, which characterizes said event;

modifying a duration over which said event vector represents said first class of traffic in said network, in response to said inference signal; and outputting control signals from a monitor to said network in response to the inference signal to control said first class of traffic.

21. A system for analyzing the output of a data communications network which communicates using a stream of data containing different classes of traffic on the network, each class having characteristic patterns, said system for outputting control signals which are customized by classes of traffic on the network, comprising:

means for storing a first criteria of rules in an expert system in said system to compare information derived from an event vector for a first class of traffic in said network with a standard for said first class of traffic in said network; each event vector descriptive of a class of traffic occurring in the network, the combination of vectors definitive of all classes of traffic on the network;

means for storing in a benchmark manger in said system a first benchmark data set as said standard for said first class of traffic, said first benchmark data set being derived from previously monitored events of said first class of traffic in said network;

means for inputting to said system an event vector from an Event Driven Interface coupled to a data communications network, in response to an event of said first class of traffic in said network;

means for accessing said first criteria of rules and comparing information derived from said event vector with said standard, using said first criteria of rules;

means for outputting from the expert system in said system, an inference signal in response to said comparison, which characterizes said event;

means for archiving information derived from said event vector in a second benchmark data set in said system, for subsequent use as said standard; and means for outputting control signals to said network to control said first class of traffic and providing customizing signals to the expert system to modify the first criteria of rules according to the network traffic class.

22. A system for analyzing the output of a data communications network which communicates using a stream of data containing different classes of traffic on the network, each class having characteristic patterns, said system for outputting control signals which are customized by classes of traffic on the network, comprising:

means for storing a first criteria of rules in said system to compare information derived from an event vector for a first class of traffic in said network with a standard for said first class of traffic in said network; each event vector descriptive of a class of traffic occurring in the network, the combination of vectors definitive of all classes of traffic on the network;

means for storing in said system a first benchmark data set as said standard for said first class of traffic, said first benchmark data set being derived from previously monitored events of said first class of traffic in said network;

means for inputting to said system an event vector from an Event Driven Interface coupled to a data communications network, in response to an event of said first class of traffic in said network;

means for accessing said first criteria of rules and comparing information derived from said event vector with said standard, using said first criteria of rules;

means for outputting in said system, an inference signal in response to said comparison, which characterizes said event, said inference signal (a) modifying criteria sequencing and selection in the expert system or changing network operating parameters and activities or changing the archiving of classes of traffic data;

means for modifying a duration over which said event vector represents said first class of traffic in said network, in response to said inference signal; and means for outputting control signals to said network to control said first class of traffic and providing signals to modify the first criteria of rules.

23. A system for analyzing the output of a data communications network which communicates using a stream of data containing different classes of traffic on the network, each class having characteristic patterns, said system for outputting control signals which are customized by classes of traffic on the network, comprising:

means for storing a first criteria of rules in an expert system in said system to compare information derived from an event vector for a first class of traffic in said network with a standard for said first class of traffic in said network; each event vector descriptive of a class of traffic occurring in the network, the combination of vectors definitive of all classes of traffic on the network;

means for storing in a benchmark manager in said system a first benchmark data set as said standard for said first class of traffic, said first benchmark data set being derived from previously monitored events of said first class of traffic in said network;

means for inputting to said system an event vector from an Event Driven Interface coupled to a data communications network, in response to an event of said first class of traffic in said network;

means for accessing said first criteria of rules in said expert system and comparing information derived from said event vector with said standard, using said first criteria of rules;

means for outputting from said expert system in said system, an inference signal in response to said comparison, which characterizes said event;

means for accessing a second criteria of rules in said expert system to compare information from an event vector for a second class of traffic in said network with a standard for a second class of traffic in said network, in response to said inference signal; and means for outputting control signals to said network in response to the inference signal to control said first class of traffic or providing modifying signals to modify the first and second criteria of rules according to the traffic classes.

* * * * *